(12) United States Patent
Matsuno et al.

(10) Patent No.: US 8,888,642 B2
(45) Date of Patent: Nov. 18, 2014

(54) POWER TOOL

(75) Inventors: Tadasuke Matsuno, Anjo (JP); Kenji Kobayashi, Anjo (JP)

(73) Assignee: Makita Corporation, Anjo-shi (JP)

( * ) Notice: Subject to any disclaimer, the term of this patent is extended or adjusted under 35 U.S.C. 154(b) by 269 days.

(21) Appl. No.: 13/405,603

(22) Filed: Feb. 27, 2012

(65) Prior Publication Data

US 2012/0247247 A1 Oct. 4, 2012

(30) Foreign Application Priority Data

Mar. 31, 2011 (JP) ................................. 2011-078036
Apr. 27, 2011 (JP) ................................. 2011-099778

(51) Int. Cl.
*F16H 15/52* (2006.01)
*F16H 57/04* (2010.01)
*F16H 57/08* (2006.01)

(52) U.S. Cl.
USPC ............................ 475/185; 475/159; 475/331

(58) Field of Classification Search
USPC ............ 74/467, 417; 475/159, 183, 185, 193, 475/194, 195, 331; 476/8, 34, 51, 63
See application file for complete search history.

(56) References Cited

U.S. PATENT DOCUMENTS

| | | | | |
|---|---|---|---|---|
| 3,108,496 A | * | 10/1963 | Kashihara | 475/194 |
| 3,182,519 A | * | 5/1965 | Grieshaber | 476/48 |
| 4,751,854 A | * | 6/1988 | Sakai et al. | 475/193 |
| 5,289,886 A | * | 3/1994 | Shikata et al. | 173/181 |
| 6,004,239 A | * | 12/1999 | Makino | 475/194 |
| 7,963,346 B2 | * | 6/2011 | Brodin | 173/217 |
| 2009/0272556 A1 | * | 11/2009 | Young et al. | 173/216 |
| 2012/0157257 A1 | * | 6/2012 | Hirabayashi et al. | 475/159 |
| 2012/0165152 A1 | * | 6/2012 | Tokunaga et al. | 475/159 |
| 2012/0252623 A1 | * | 10/2012 | Hirabayashi et al. | 475/185 |

FOREIGN PATENT DOCUMENTS

| | | | | |
|---|---|---|---|---|
| JP | B2-3-073411 | | 11/1987 | |
| JP | 02309044 A | * | 12/1990 | 475/159 |
| JP | 05187497 A | * | 7/1993 | 475/159 |
| JP | A-06-190740 | | 7/1994 | |
| JP | H-9-236160 | | 9/1997 | |
| JP | A-2002-059370 | | 2/2002 | |
| NL | 9101200 | | 2/1993 | |
| WO | WO 2011/024698 A1 | | 3/2011 | |

OTHER PUBLICATIONS

Aug. 24, 2012 Partial European Search Report issued in European Patent Application No. 12155834.0.
Apr. 15, 2014 Notification of Reasons for Rejection issued in Japanese Patent Application No. 2011-078036 (with English-language translation).

* cited by examiner

*Primary Examiner* — Roger Pang
(74) *Attorney, Agent, or Firm* — Oliff PLC

(57) ABSTRACT

Embodiments of the present invention may include a power tool including a drive motor and a continuously variable transmission mechanism. The continuously variable transmission mechanism may include a sun roller rotated by a drive motor, the sun roller configured to press on a plurality of planetary rollers, a holder radially supporting the plurality of planetary rollers, a shift ring being in internal contact with the plurality of planetary rollers, and a resistance reducing portion disposed at the holder to fill a gap between the two of the planetary rollers.

14 Claims, 19 Drawing Sheets

POWER TOOL

This application claims priority to Japanese patent applications serial number 2011-78036 and 2011-99778, the contents of which are incorporated herein by reference.

BACKGROUND OF THE INVENTION

1. Field of the Invention

The present invention relates to a power tool, such as a disc grinder, an electric screwdriver, or a drill for boring, which is equipped with an electric motor therein as a power source.

2. Description of the Related Art

Such a power tool is generally equipped with either a gear train for changing the number of output revolutions of a motor or a gear train for changing the output direction. A CVT (Continuously Variable Transmission) that continuously varies the gear train and reduction ratio is commonly used as a transmission mechanism for power tools. Technology concerning CVT traction drives are disclosed, for example, in JP No. 6-190740 A, JP No. 2002-59370 A, and JP No. 3-73411 B2.

In a continuously variable transmission traction drive, a plurality of conical planetary rollers are supported by a holder. A centrally located sun roller is pressed onto the planetary rollers. A shift ring located around the holder is pressed onto the planetary rollers. Through rolling contact, planetary rollers transmit rotational power to an output shaft. The number of output revolutions is continuously altered due to the changing of the position of the shift ring relative to the planetary rollers. The pressing position of the shift ring pressed to the conical surfaces of the planetary rollers is varied between a small diameter and a large diameter.

A screw-tightening tool equipped with a continuously variable transmission therein is disclosed in JP 6-190740 A. In the screw-tightening tool, it is possible to continuously vary the speed and torque output. This is accomplished by moving a shift ring. In creating low speed/high torque output, thread-fastening can be easily performed.

A continuously variable transmission mechanism traction drive has various problems. In this type of continuously variable transmission mechanism, a transmission case is filled with a lubricant for transmitting power. Typical lubricants include traction oil or traction grease. Appropriate lubricants for use in CVTs have a relatively high viscosity in order to produce a high transmission coefficient (traction coefficient). During operation, the lubricant filled in the transmission case is scraped and supplied to the pressing portion of the planetary rollers. This occurs during the revolution of the planetary rollers and the rotation of the holder. This operation results in power transmission.

When the planetary rollers rotate, they in turn, scrape the lubricant. Accumulated lubricant unintentionally becomes stirring resistance in the power transmission system. As the load from this stirring resistance increases, the torque in the power transmission system decreases.

Accordingly, a power tool is desired that can suppress reduction of the output torque and/or prevent increase of load current in a motor. One method for accomplishing this is by reducing the stirring resistance of a lubricant, such as traction oil.

SUMMARY OF THE INVENTION

One aspect of the present invention includes a power tool having a motor and a continuously variable transmission mechanism. The continuously variable transmission mechanism comprises a sun roller rotated by the motor, a plurality of planetary rollers where the sun roller is pressed, a holder radially supporting the plurality of planetary rollers, a shift ring being in internal contact with the plurality of planetary rollers, and a resistance reducing portion disposed at the holder to fill a gap between the two of planetary rollers adjacently located in the circumferential direction of the holder.

Preferably, the space between two planetary rollers adjacently located in the circumferential direction of the holder is filled with the resistance reducing portion. Consequently, it is possible to achieve an assembly closer to a smooth cylindrical shape by reducing concavities and convexities in the holder. As a result, it is possible to reduce scraping resistance of a lubricant, such as traction oil, when the planetary rollers revolve, which in turn, reduce the current load of the motor.

DETAILED DESCRIPTION OF THE INVENTION

Figure 1:
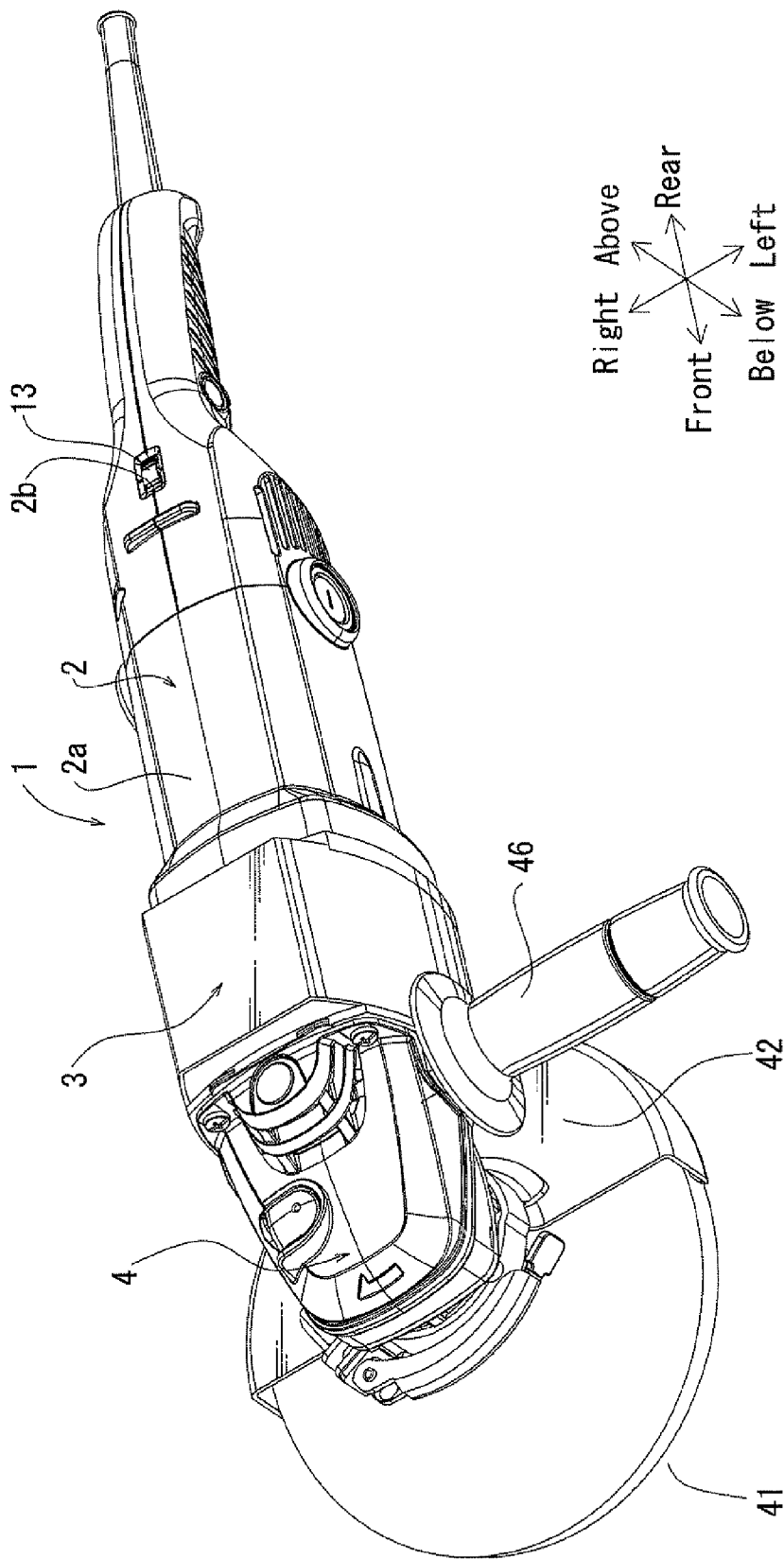
FIG. 1 is a perspective view of a disc grinder.

Each of the additional features and teachings disclosed above and below may be utilized separately or in conjunction with other features and teachings to provide improved power tools. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Embodiments of the present invention are described with respect to basis of FIGS. 1 to 23. The power tool of the embodiment described below is an example of a disc grinder 1. The disc grinder 1 generally includes a tool main body 2, a shifting portion 3, and a gear head portion 4. A circular grindstone 41 is mounted on a spindle 40 protruding downward from the bottom of the gear head portion 4. A grind stone cover 42 for preventing grind dust from scattering is mounted at the rear half of the grind stone 41.

In the tool main body 2, a motor 10 is used as a drive source in a cylindrical main body case 2a. The main body case 2a may also serve as a handle for a user. A cooling fan 12 is fitted on an output shaft 11 of the motor 10. External air is suctioned from the rear portion of the tool main body 2 by rotation of the cooling fan 12 and moved to the front portion of the tool main body 2c The air serves to cool the drive motor 10. The output shaft 11 of the drive motor 10 is rotatably supported inside the main body case 2a by bearings 11a and 11b.

The rotational output of the drive motor 10 is transmitted to the spindle 40 through the continuously variable transmission mechanism 30 and the gear head portion 4. The number of revolutions of the output shaft 11 of the drive motor 10 is altered by the shifting portion 3. The shifting portion 3 includes a continuously variable transmission mechanism 30 and a shift control portion 20 for controlling the continuously variable transmission mechanism 30. The shifting portion 3 is located in a transmission case 3a connected to the front portion of the tool main body 2.

The continuously variable transmission mechanism 30 is preferably a three-point pressure type which includes a centrally-located sun roller 32 fitted on the output shaft 11 of the motor 10. It may also contain a plurality (three in the embodiment) of planetary rollers 33 having a conical surface 33b, a push roller 34 pressed to the planetary rollers 33, a pressure-adjusting cam mechanism 35 for transmitting a pushing force to the push roller 34 and shift rings 36 having an inner circumference pressed to the conical surfaces 33b of the planetary rollers 33.

In the three-point pressure continuously variable transmission mechanism, the planetary rollers 33 rotate about the center axis and revolve around the sun roller 32 in the same direction as the rotation of the sun roller 32. The push roller 34 rotates in the opposite direction of the rotation of the sun roller 32.

The three-point pressure continuously variable transmission mechanism 30 includes a sun roller 32 fitted on the output shaft 11 of the drive motor 10, a plurality of (three in the embodiment) planetary rollers 33 having a conical surface 33b, a push roller 34 pressed to the planetary rollers 33, a pressure-adjusting cam mechanism 35 for generating a pushing force to the push roller 34 and shift rings 36 having an inner circumference pressed to the conical surfaces 33b of the planetary rollers 33.

The sun roller 32 is fitted at the front-end portion of the output shaft 11 of the drive motor 10. The sun roller 32 may be rotatably supported by the bearing 32a in the transmission case 3a. The sun roller 32 may then be pressed to the heads of the three planetary rollers 33.

The rear portion of the output shaft 31 is rotatably supported by the bearing 32b fitted on the sun roller 32. The sun roller 32 and the output shaft 31 are coaxially positioned with the output shaft 11 of the motor 10.

The front portion of the output shaft 31 is rotatably supported in the front portion of the transmission case 3a by the bearing 31b. The front portion of the output shaft 31 protrudes from the inside of the transmission case 3a to the inside of the gear head portion 4. A bevel gear 43 of the driving side is mounted at the front end of the output shaft 31.

The three planetary rollers 33 are supported by support shaft portions 33a and are inserted in support holes 37e formed at three positions with regular intervals in the circumferential direction of the holder 37. The three planetary rollers 33 are supported to be rotatable about the pivot axes of the support shaft portions 33a with respect to the holder 37. The planetary roller 33 is supported with the rotational axis (support shaft portion 33a) inclined at a predetermined angle from the vertical position (position perpendicular to the output shaft 31).

The push roller 34 is supported by the output shaft 31 whereby it may be rotated, axially displaced, and be pressed against the planetary rollers 33. The holder 37 is rotatably supported with respect to the transmission case 3a through a boss portion 34a disposed on the rear surface of the push roller 34. The pressure-adjusting cam mechanism 35 is disposed on the side of the front surface of the push roller 34.

The pressure-adjusting cam mechanism 35 may include a plurality of steel balls 39 interposed between the front surface of the push roller 34 and a pressing plate 38. Each of the steel balls 39 is fitted in cam grooves formed on the front surface of the push roller 34 and the rear surface of the pressing plate 38. A compressing spring 35a is disposed between the push roller 34 and the pressing plate 38. The pressing plate 38 is pressed to a flange portion 31a of the output shaft 31 and the axial movement is restricted by the compressing spring 35a. The pressing plate 38 is coupled to the output shaft 31 by a key 31c. The pressing plate preferably integrally rotates with the output shaft 31.

When a rotational load is applied to the output shaft 31, rotation is generated between the push roller 34 and the pressing plate 38, such that the steel balls 39 are moved to the shallow side of the cam groove by an external force. Eventually the force that presses the push roller 34 to the planetary roller 33 increases. The push roller 34 is pressed against each of the planetary rollers 33 by the external force and the biasing force of the compressing spring 35a. The sun roller 32 is pressed to the head of each of the planetary rollers 33 and the shift ring 36 is pressed to the conical surface 33b of each of the planetary rollers 33 by the same force.

The motor 10 rotates the sun roller 32 which thereby rotate the planetary rollers 33 about the pivot axis. The planetary rollers 33 revolve around the output shaft 31 while being supported by the holder 37. As the planetary rollers 33 revolve around the output shaft 31, the push roller 34 integrally rotates with the holder 37.

When the push roller 34 rotates, the output shaft 31 integrally rotates via the pressure-adjusting cam mechanism 35.

When the motor 10 is started, rotational power is transmitted to the spindle 40 through the continuously variable transmission mechanism 30 in the three-point pressing state. This power is used by a reduction gear train 45 of the gear head portion 4, to rotate a grindstone 41.

A bevel gear 43 of the driving side of the gear head portion 4 is fitted on the output shaft 31 of the continuously variable transmission mechanism 30. A bevel gear 44 of the receiving side is engaged with the bevel gear 43. The bevel gear 44 may be fitted on the spindle 40. The reduction gear train 45 with a constant reduction ratio may be composed of the engaged bevel gears 43 and 44. The spindle 40 lies perpendicular to the output shaft 31 of the continuously variable transmission mechanism 30 (output shaft 11 of the drive motor 10) and next to the reduction gear train 45. The output shaft 31 of the continuously variable transmission mechanism 30 is coaxially positioned with the output shaft 11 of the motor 10.

As shown in FIG. 1 a side grip 46 protrudes in a side direction at the left side of the gear head portion 4. A user holds the tool main body 2 with the right hand and holds the side grip 46 with the left hand.

During power transmission between the spindle 40 and the grindstone 41, the shift ring 36 of the continuously variable transmission mechanism 30 may be positioned at an area on the planetary rollers 33 having a small diameter. When this occurs, the revolving speed of the planetary rollers 33 decreases, the rotation speed of planetary rollers 33 increases, and the rotational speed of the push roller 34 increases. For clarification, the "revolving speed" refers to the speed about which the planetary rollers revolve about the output shaft 31, while "rotational speed" refers to the speed about which they rotate about their own axis. In this way the reduction ratio of the continuously variable transmission mechanism 30 decreases and the spindle 40 rotates at a high speed.

When the shift ring 36 is positioned at an area of the planetary rollers 33 having a large diameter, the revolving speed of the planetary rollers 33 increases, the rotation speed of planetary rollers 33 decreases and the rotation of the push roller 34 decreases. In this way the reduction ratio of the continuously variable transmission mechanism 30 increases and the spindle 40 rotates at a low speed.

Figure 6:
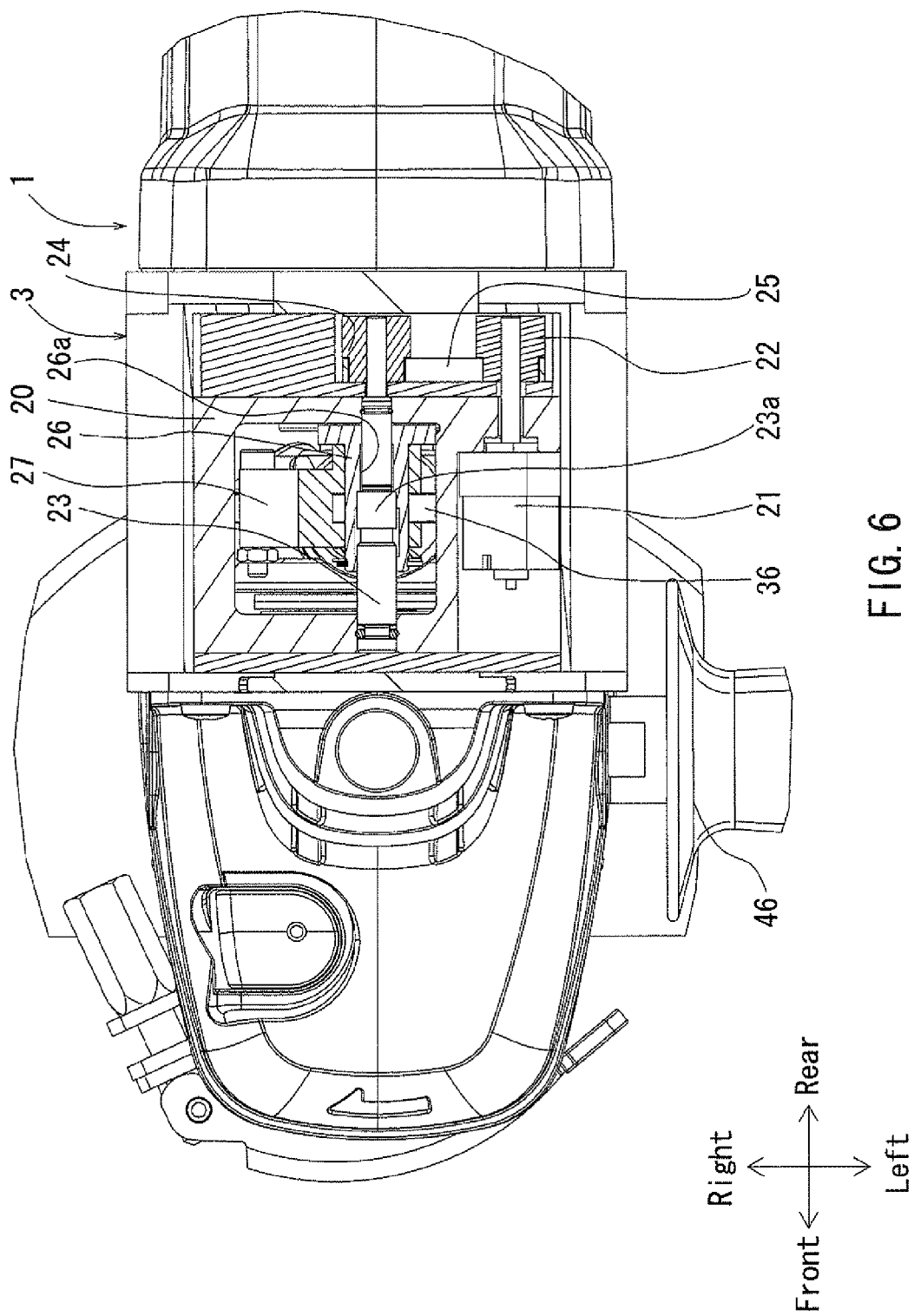
FIG. 6 is a plain view of a front portion of the disc grinder showing a cross-sectional view of the shift control position taken along line VI-VI in FIG. 2.

The shifting portion 3 includes a shift control portion 20 for shifting the continuously variable transmission mechanism 30. The shift control portion 20 is disposed at the upper portion of the shifting portion 3, on the outer circumference of the shift ring 36. The shift control portion 20, as shown in FIG. 6, includes a shift motor 21, a drive pulley 22 fitted on the output shaft of the shift motor 21, an operation shaft 23 disposed in parallel with the output shaft of the shift motor 21, a receiving pulley 24 fitted on the operation shaft 23 and a driving belt 25 held around the drive pulley 22 and the receiving pulley 24. When the shift motor 21 starts, the operation shaft 23 rotates about the pivot axis by movement of the drive belt 25.

A threaded portion 23a is formed on the operation shaft 23. An operation sleeve 26 is fitted on the circumference of the operation shaft 23. The threaded portion 23a of the operation shaft 23 is fastened in a threaded hole 26a of the operation sleeve 26. When the operation shaft 23 rotates about the pivot axis, the threaded portion 23a moves along the threaded hole 26a, such that the operation sleeve 26 moves in the axial direction (left-right direction in FIG. 6) of the operation shaft 23. A bifurcated operation arm 27 is disposed on the operation sleeve 26, preferably immovably, in the forward direction with respect to the operation sleeve 26. The upper portion of the shift ring 36 is interposed and fitted inside the bifurcated portion of the operation arm 27 axially from both sides.

Accordingly, when the operation sleeve 26 is moved in the left-right direction by rotation of the operation shaft 23 in FIG. 6, the shift ring 36 moves in parallel to a low speed side or a high-speed side in internal contact to the three planetary rollers 33.

The shift control portion 20 is disposed in the continuously variable transmission mechanism 30. When the shift motor 21 of the shift control portion 20 starts at the high-speed side and the operation shaft 23 is rotated, the shift ring 36 moves to the high-speed sides (low diameter side) of the planetary rollers 33, such that the reduction ratio decreases. As a result, the spindle 40 and the grindstone 41 are rotated at a high speed (the number of rotations increases). On the contrary, when the shift motor 21 of the shift control portion 20 is started at the low speed side and the operation shaft 23 is rotated backward, the shift ring 36 moves to the low speed sides (large diameter side) of the planetary rollers 33, such that the reduction ratio increases. As a result, the number of revolutions of the spindle 40 and the grind stone 41 decreases and they rotate slowly.

The operations of the drive motor 10 and the shift motor 21 are controlled by a motor control portion.

Figure 2:
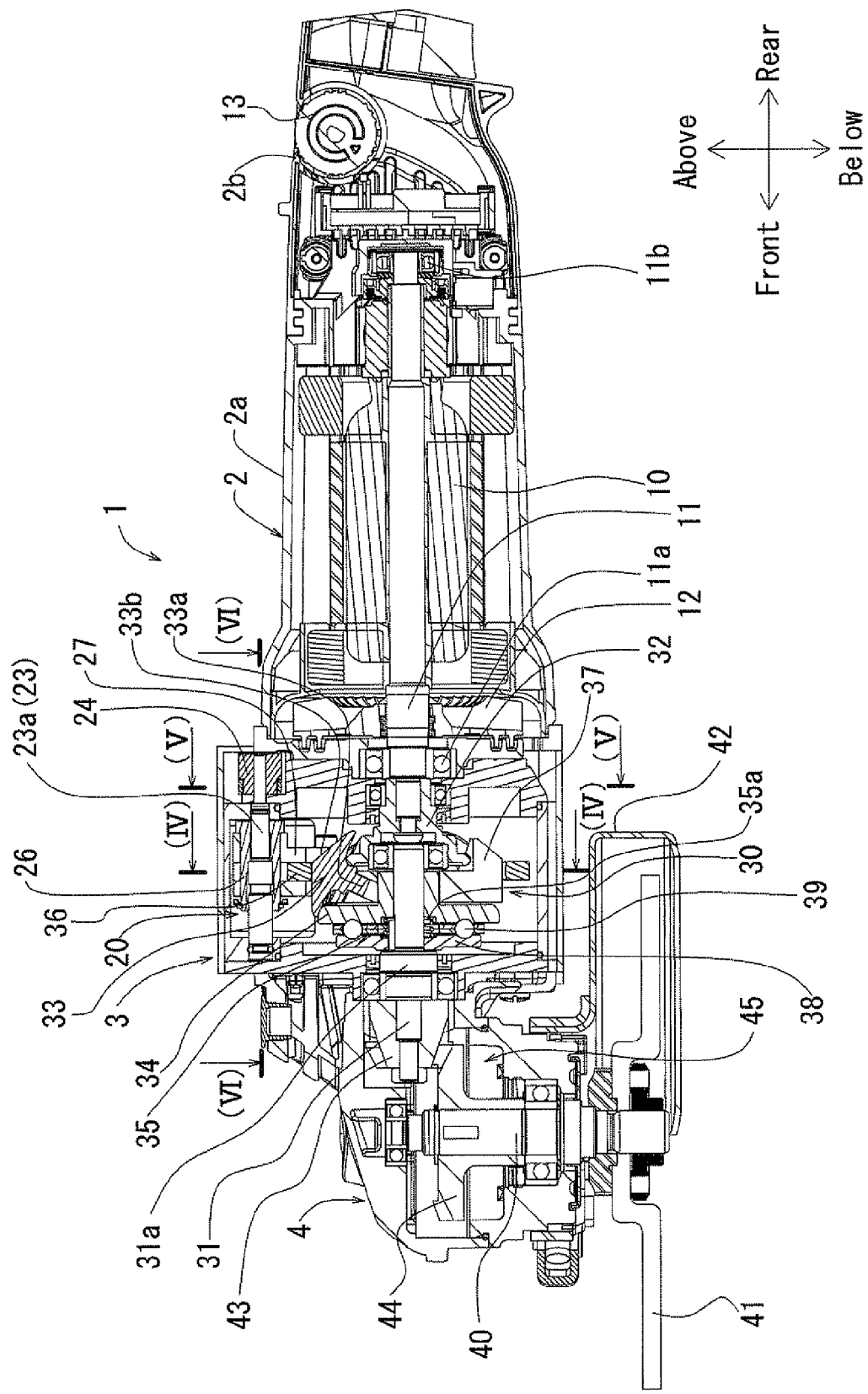
FIG. 2 is a cross-sectional view of an inner mechanism of a disc grinder.

The shift control portion 20, which controls the position of the shift ring 36, via the shift motor 21 is activated in accordance with the operation state of an operation member 13. As shown in FIGS. 1 and 2, the operation member 13 is disposed on the upper surface of the rear portion of the main body 2. The operation member 13 may be, for example, a disc-shaped dial. The upper portion of the operation member 13 protrudes towards the window portion 2b disposed on the main body case 2a. The operation member 13 is turned by operation of the upper portion.

Figure 7:
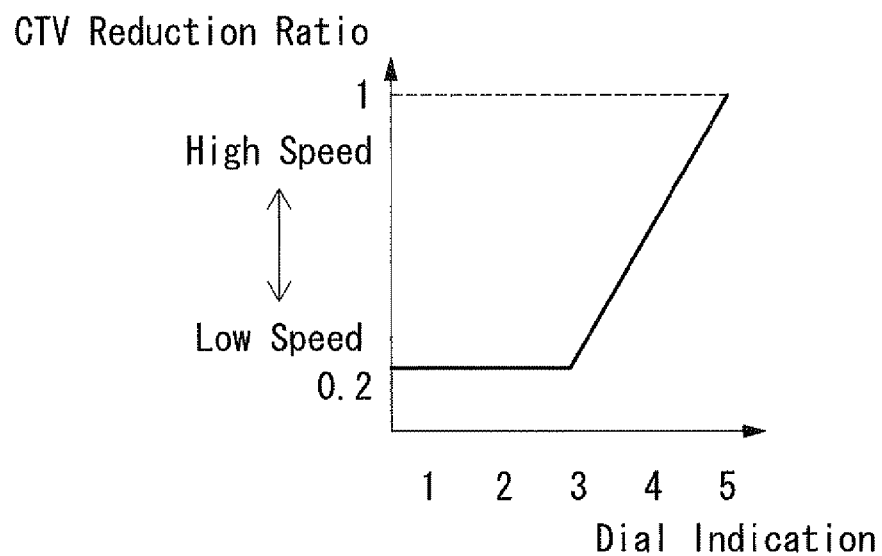
FIG. 7 is a graph showing a continuously variable transmission with respect to a dial indicator.
Figure 8:
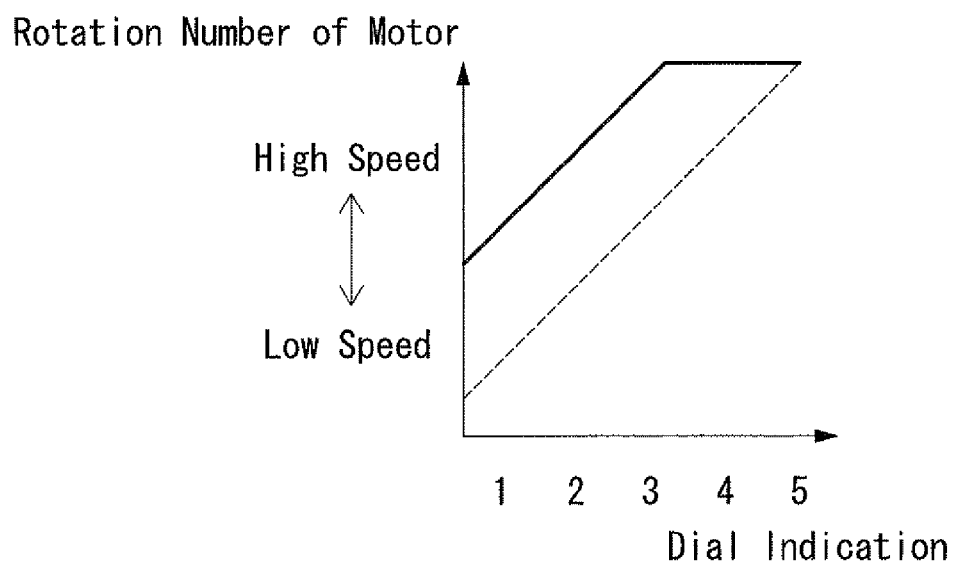
FIG. 8 is a graph showing the condition of a drive motor with respect to the dial indicator.
Figure 9:
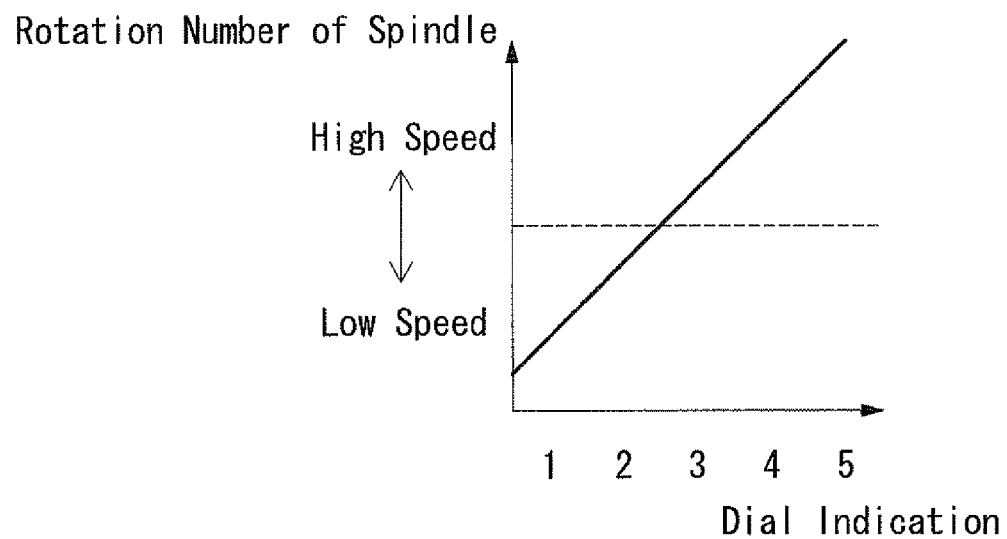
FIG. 9 is a graph showing the condition of a spindle with respect to the dial indicator.

Five-stepped indications "1" to "5" may be disposed on the outer circumference of the operation member 13. When the operation member 13 is operated and turned on, an indication signal is input to the motor control portion. Activation serves to regulate the number of revolutions of the drive motor 10. Activating the motor 10, also activates the shift motor 21 of the shift control portion 20. FIG. 7 shows a change in the reduction ratio of the continuously variable transmission mechanism 30 through the operation of the operation member 13. FIG. 8 shows a change in the number of revolutions of the drive motor 10 through operation of the operation member 13. FIG. 9 shows a change in the number of revolutions of the spindle 40 through operation of the operation member 13.

Figure 3:
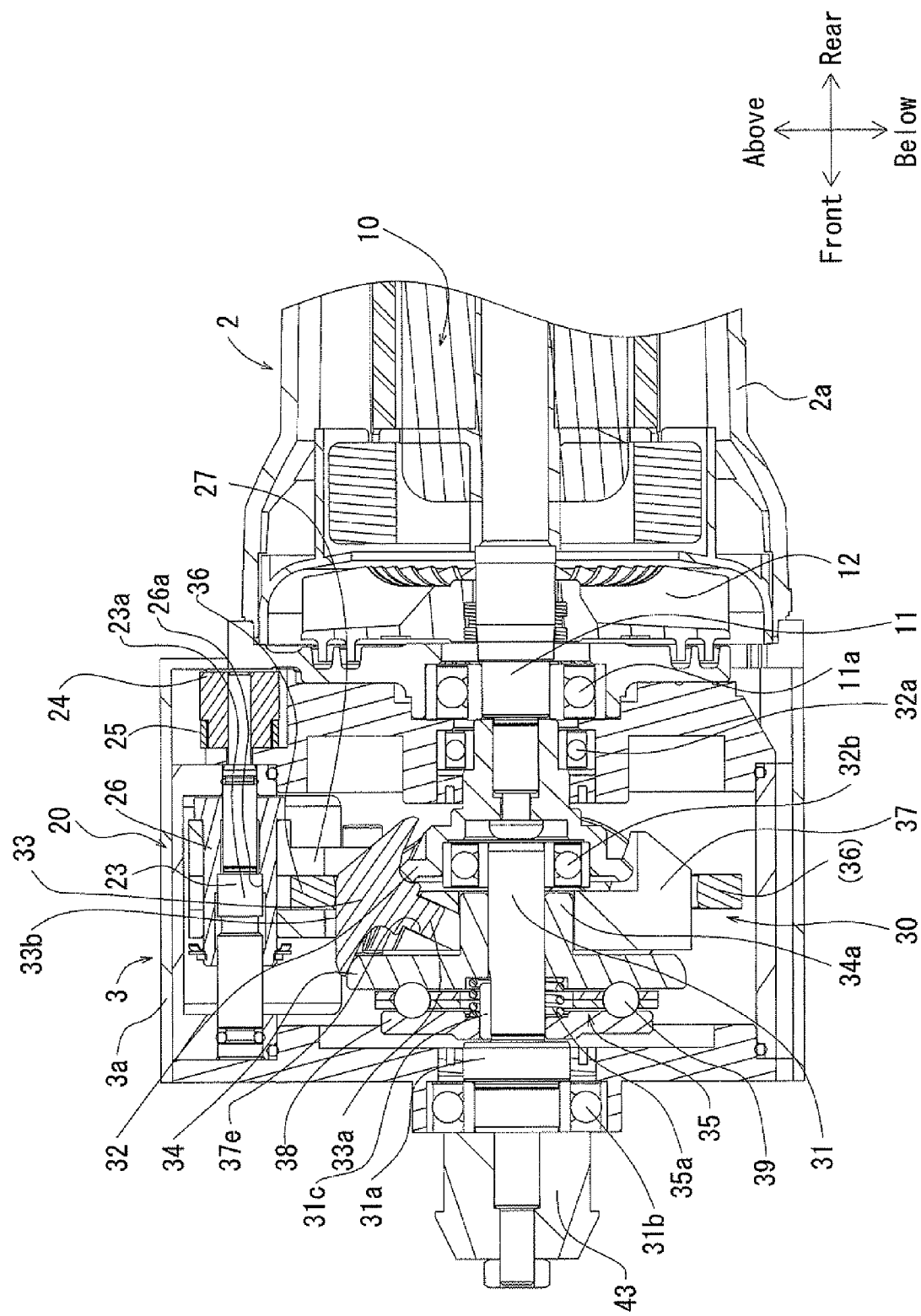
FIG. 3 is an exploded view of a shifting portion.
Figure 4:
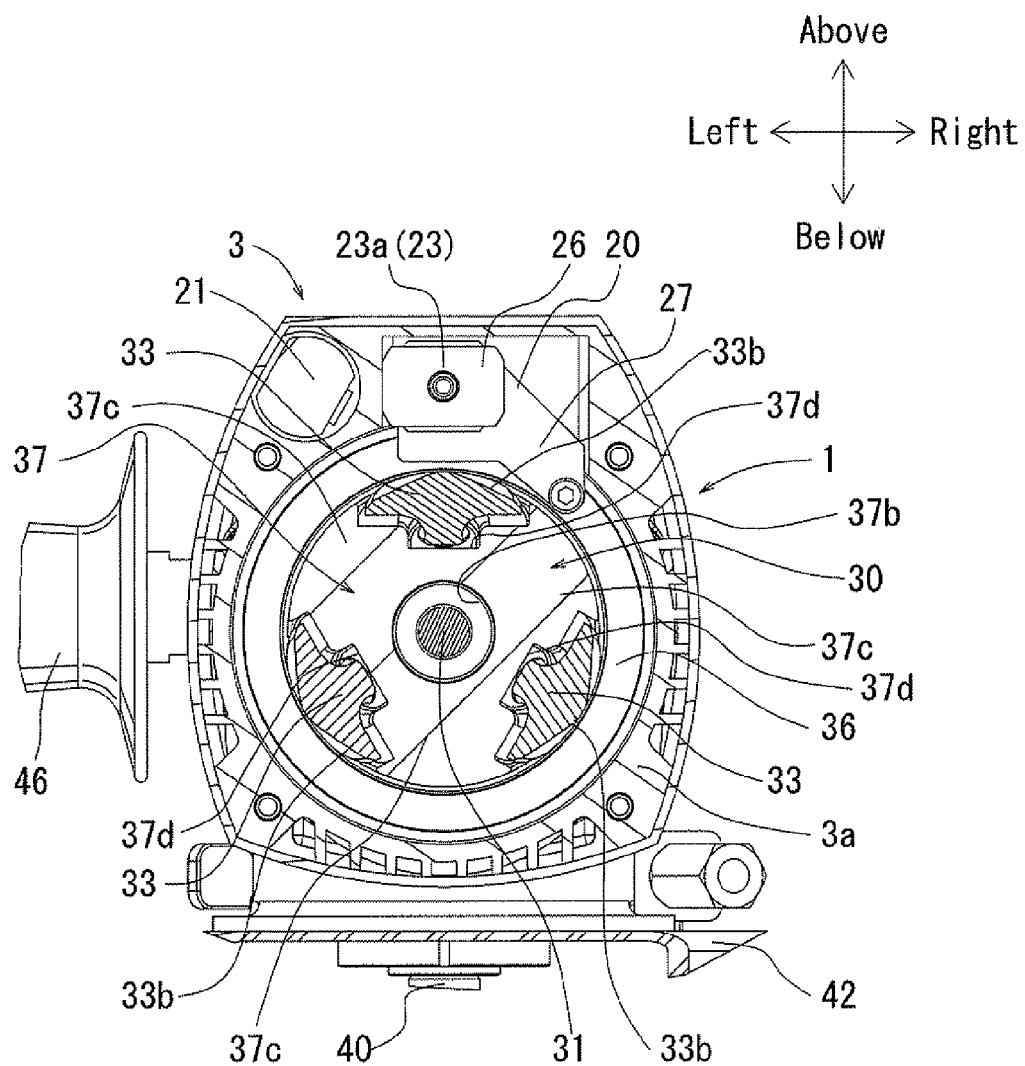
FIG. 4 is a cross-sectional view of the shifting portion taken along line IV-IV in FIG. 2.
Figure 5:
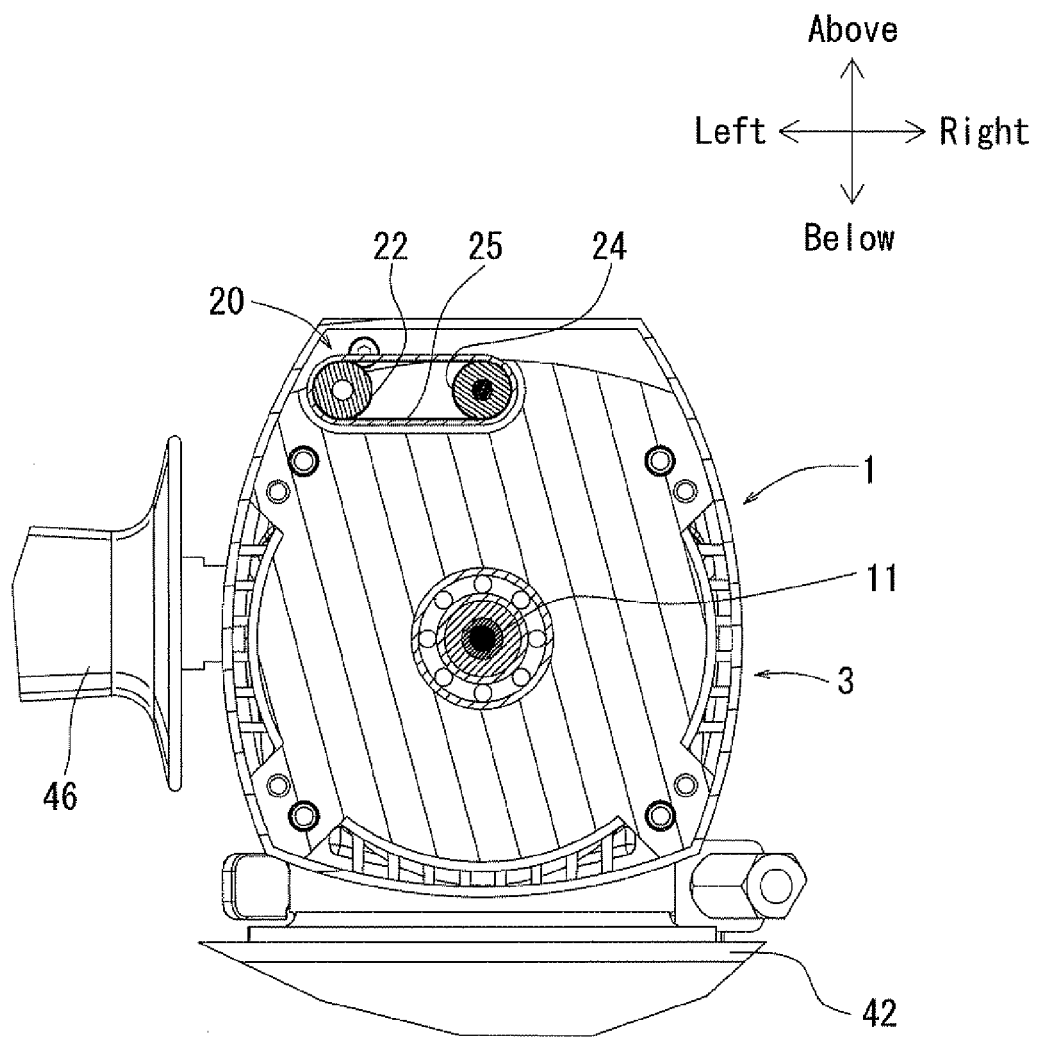
FIG. 5 is a cross-sectional view of a shift control portion taken along line V-V in FIG. 2.

As shown in FIG. 7, when the operation member 13 is positioned within the indicators "1" to "3", the shift motor 21 of the shift control portion 20 is started at the low speed side and the shift ring 36 is positioned at the large diameter side of the planetary rollers 33. Accordingly, the reduction ratio of the continuously variable transmission mechanism 30 is maintained at about 0.2 (low speed side). When the operation member 13 is positioned within the indicators "3" to "5", the shift motor 21 is started at the high speed side in accordance with the position and the shift ring 36 is moved to the low diameter side of the planetary rollers 33, as shown in FIGS. 2 and 3. Therefore, the reduction ratio of the continuously variable transmission mechanism 30 continuously increases in accordance with the position of the operation member 13 and becomes about 1.0 (high speed side) at the indicator "5".

As shown in FIG. 8, when the operation member 13 is positioned within the indicators "1" to "3", the number of output revolutions of the drive motor 10 continuously varies in accordance with the position of the operation member 13. When the operation member 13 is positioned at the indicator "1", the number of output revolutions of the drive motor 10 is set to a minimum. The low speed in the indicator "1" can be shifted to a higher speed. Therefore, as shown by a dotted line in FIG. 8, when this occurs, a large reduction in output torque does not occur. When the operation member 13 is positioned within the indicators "3" to "5", the number of output revolutions of the drive motor 10 becomes the maximum number of revolutions while the output torque of the drive motor 10 reaches maximum full power.

When the operation member 13 is adjusted between "1" and "5" reduction ratio of the continuously variable transmission mechanism 30 and the number of output revolutions of the drive motor 10 are modified. The reduction ratio and the number of output revolutions are output to the spindle 40. Accordingly, as shown in FIG. 9, it is possible to continuously vary the number of revolutions of the spindle 40 in a large shift width in accordance with the position of the operation member 13. Further, even in the low speed section, the number of output revolutions of the drive motor 10 can be maintained at a high speed, such that it is possible to keep the rotational torque (machining force) of the spindle 40 and the grind stone 41 high.

When the operation member 13 is adjusted within the indicator range "1" to "3", the continuously variable transmission mechanism 30 operates at a low speed reduction ratio while the drive motor operates at a mid-range level. Therefore, it is possible to rotate the spindle 40 and the grind stone 41 with a large reduction ratio without causing a large drop in power. In this instance, it is possible to perform a grinding process on a stone member, for example, by slowly rotating the grindstone 41 with a large torque. In such a manner it is possible to efficiently and rapidly perform a grinding process without scattering grind dust or grind water around.

Accordingly, in the power tool 1, the shift by the continuously variable transmission mechanism 30 and the shift of the drive motor 10 are output to the spindle 40. For this configuration, the shift width of the power tool 1 can be set to a large level.

In the low speed section of the spindle 40, it is possible to keep the number of output revolutions of the drive motor 10 on a high-speed side by adjusting the continuously variable transmission mechanism 30. Accordingly, it is possible to avoid large reductions in power down in the low speed section. When shifting the continuously variable transmission mechanism 30 to a low speed, the number of revolutions of the motor is reduced and one can rotate the spindle 40 with a large reduction ratio. Alternatively, shifting the continuously variable transmission mechanism 30 to a high speed, the number of revolutions is increased and the spindle 40 can rotate with a small reduction ratio.

In a continuously variable transmission mechanism 30 traction drive, a lubricant (for example, traction oil or traction grease) for forming an oil layer for power transmission may be applied to the sun roller 32, the push roller 34 and the shift ring 36. The transmission case 3a may be filled with an appropriate amount of lubricant. Each part of the transmission case 3a is sealed to prevent leakage of the lubricant. When the power tool 1 is used, the lubricant is stored in the lower portion in the transmission case 3a may be contacted mainly by the three planetary rollers 33 and the holder 37, such that the lubricant is applied to each of the pressing portions.

Stirring resistance of the lubricant may be generated during power transmission when the holder 37 is rotated and the planetary rollers 33 revolve. The stirring resistance of the lubricant effectively adds to the resistance of the planetary rollers 33, the rotational resistance of the holder 37, and the rotational resistance of the output shaft 31 of the continuously variable transmission mechanism 30. This, in turn, generates a loss of torque in the power transmission system.

The stirring resistance of the lubricant causes a decrease of the rotational torque of the spindle 40, such that the current load of the drive motor 10 increases. The planetary rollers 33 radially surrounding the holder 37 create stirring resistance. In order to reduce the stirring resistance of the lubricant in the embodiment, the holder 37 is provided with resistance reducing portions for filling the gaps between adjacent planetary rollers 33.

Figure 10:
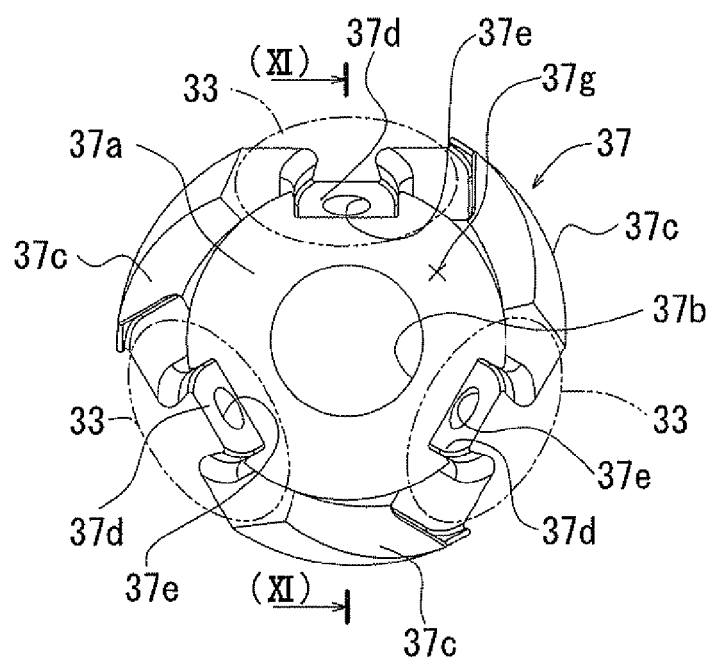
FIG. 10 is a rear view of a holder.
Figure 11:
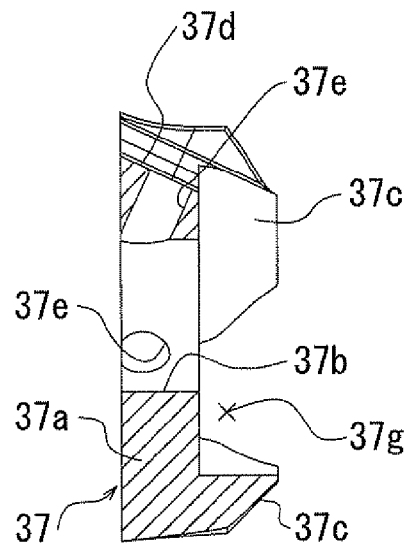
FIG. 11 is a cross-sectional view taken along line XI-XI in FIG. 10.

As shown in FIGS. 10 and 11, the holder 37 has a disc-shaped base 37a. An insertion hole 37b for inserting the output shaft 31 is formed at the center of the base 37a. Flat roller support seats 37d for supporting each of the planetary rollers 33 are formed at three positions around the circumference of the base 37a. One support hole 37e is formed at the center of the roller support seat 37d. The shaft support portion 33a of the planetary roller 33 is inserted in the support hole 37e, such that each of the planetary rollers 33 is able to rotate about the pivot axis of the support shaft portion 33a.

The resistance reducing portions 37c are formed at both sides of each of the roller support seats 37d. They are preferably arranged such that they do not interfere with the rotation of the planetary rollers 33 when they rise up from the edge of the base 37a. The resistance reducing portion 37c slightly rises up with respect to the conical surface 33b of the planetary roller 33. It is preferred that the resistance reducing portion 37c may rise up such that it does not interfere with the inner circumferential surface of the shift ring 36. The resistance reducing portion 37c protrudes radially outward from both sides of the roller support seat 37d and extends towards the sun roller 32.

The outer circumferential surface of the resistance reducing portion 37c is cut in a polygonal shape to avoid interference with the shift ring 36.

The resistance reducing portions 37c fill the gaps between the planetary rollers 33 around the holder 37. The assembly of the holder 37 and the planetary rollers 33 generally has shape with small concavities and convexities in the circumferential direction. In this configuration, the lubricant scraping resistance is reduced during revolution of the assembly.

Further, the loss of output torque of the spindle 40 may be reduced and the current load of the drive motor 10 can be prevented from increasing.

The reduction in scraping resistance is particularly useful with a high viscosity lubricant. It can reduce the resistance during high-speed rotation.

The resistance reducing portions 37c fill the gaps between two planetary rollers 33. The gaps between the resistance reducing portions 37c and the planetary rollers 33 are reduced such that they do not interfere with each other. When traction grease is used as the lubricant for the continuously variable transmission mechanism 30, the narrow space between the planetary roller 33 and the resistance reducing portion 37c can function to store grease. In such a manner, the pressing portions can stay lubricated.

The resistance reducing portions 37c may extend towards the sun roller 32. Therefore, as shown in FIG. 11, a space 37g surrounded by the resistance reducing portions 37c is formed at the three positions on the drive side of the base 37a. The space 37g can function as a grease storage location.

The space 37g may serve to hold grease to keep the planetary rollers 33 lubricated. During rotation of the planetary rollers 33, this space 37g also functions to prevent scattering of the grease from the holder.

Figure 12:
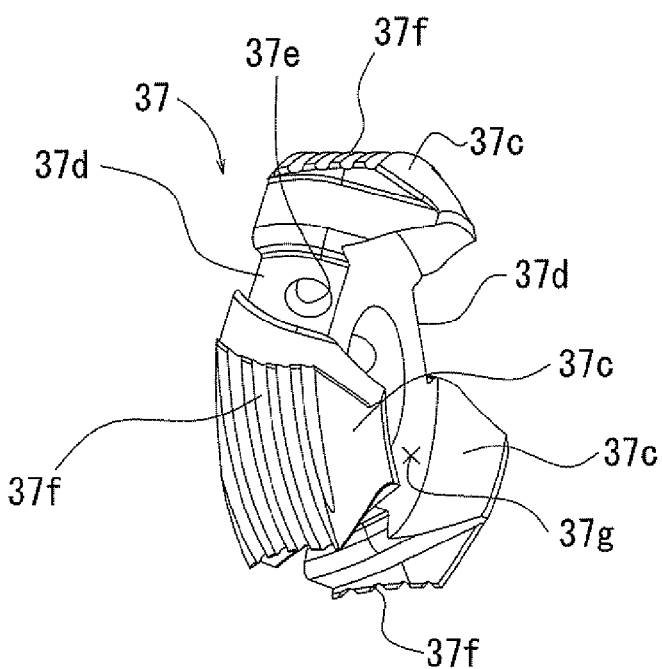
FIG. 12 is an embodiment of a holder provided with a scraping groove.

As shown in FIGS. 10 and 11, the circumferential surfaces of the resistance reducing portions 37c of the holder 37 have a smooth shape. Such shapes ensure minimal lubricant scraping resistance. As shown in FIG. 12, a plurality of scraping grooves 37f may be formed on the circumferential surfaces of the resistance reducing portions 37c of the holder 37.

The scraping grooves 37f are disposed along a spiral path in the inclined direction with respect to the rotational axis of the holder 37. Scraping grooves 37f may be formed in the rotational direction of the holder 37. When the holder 37 rotates, the scraping grooves 37f serve to reduce scraping resistance. Compared to a holder without the resistance reducing portions 37c, this holder 37 efficiently guides lubricant along the inside of the scraping grooves 37f to increase upward scraping and reduce scraping resistance.

As a power tool 1, a disc grinder is generally used in a position with the grindstone 41 facing down at an angle. In such a situation, the lubricant gathers at the front portion of the transmission case 3a, but it is scraped rearward and upward at an angle by the scraping grooves 37f disposed on the circumferential surface of the rotating holder 37. In this fashion, the lubricant is more uniformly supplied to the planetary rollers 33.

As described above, the power tool 1 may include a continuously variable transmission mechanism 30 traction drive therein.

A continuously variable transmission mechanism 30 may include a sun roller 32 rotated by the drive motor 10, a plurality of planetary rollers 33 pressed by the sun roller 32, a holder 37 radially supporting the plurality of planetary rollers 33, and a shift ring 36 being in internal contact with the plurality of planetary rollers 33. A resistance reducing portion 37c may be disposed on the holder 37. The resistance-reducing portion 37 may be used for filling the gap between the planetary rollers 33.

The space between two adjacent planetary rollers 33 may be filled with the resistance reducing portion 37c. It is possible to achieve an assembly having a nearly cylindrical shape by reducing concavities and convexities in the holder 37. As a result, it is possible to reduce scraping resistance of a lubricant, such as traction oil, when the planetary rollers 33 revolve. This produces a reduced current load in the motor.

The holder 37 supports the planetary rollers 33 on the circumferential surface of the disc-shaped base 37a. The gap between the base 37a and the shift ring 36 may be filled with the resistance reducing portion 37c. It is possible to reduce the concavities and convexities in the rotational direction of the holder. In this manner, as the shape of the assembly closely resembles a cylinder. In this manner, the scraping resistance of the lubricant is decreased.

In the continuously variable transmission mechanism 30, the gap between two adjacent planetary rollers 33 may be filled with a resistance reducing portion 37c whereby it does not interfere with the planetary rollers 33 nor the shift ring 36. A predetermined gap is defined between each of the planetary rollers 33 and the resistance reducing portion 37c. The resistance reducing portions 37c preferably do not interfere with the planetary rollers 33.

The resistance reducing portions 37c extend towards the sun roller 32. A space surrounded by the plurality of resistance reducing portions 37e is defined in the holder 37. Therefore, radial scattering of the lubricant due to the rotation of the holder 37 and the revolution of the planetary rollers 33 may be suppressed. The lubricant is efficiently supplied to the pressing portions and power can be transmitted for a long time. This results in improved durability of the continuously variable transmission mechanism.

When traction grease is used as the lubricant, the gap or the space 37g between the planetary roller 33 as well as the resistance reducing portion 37c may be used for grease storage. In this way, the traction grease is prevented from scattering because it is generally held to the periphery of the planetary roller 33.

Durability of the continuously variable transmission mechanism 30 can be improved through efficient supplying of lubricant to the pressing portions.

The scraping grooves 37f for scraping the lubricant may be formed on the circumferential surface of the resistance reducing portion 37c. Accordingly, the scraping resistance with respect to the lubricant of the planetary rollers 33 is reduced and the lubricant is efficiently scraped by the scraping grooves 37f. In this manner, power is continuously supplied to the continuously variable transmission mechanism 30 and its durability is improved.

The embodiment described above can be modified in various ways. For example, a fan may be formed by adding a blade-shaped portion extending rearward on the resistance reducing portion 37c. In this way, it would be possible to reduce the scraping resistance of the planetary rollers and efficiently scrape the lubricant by using the resistance reducing portions.

As shown in FIGS. 10 and 12, the resistance reducing portions 37c, may be formed by appropriately cutting (removing) the surface in order to avoid interference with the planetary rollers 33 and the shift ring 36. The resistance reducing portions may be symmetrically or asymmetrically aligned with respect to the planetary rollers 33. The resistance reducing portions may be formed in a shape symmetric to both front and rear planetary rollers 33. In this way, it is possible to reduce the scraping resistance on both sides of each of the planetary rollers 33.

The resistance reducing portions 37c may be integrally formed with the base 37a. Alternatively, separate resistance reducing portions may be attached around the holder. The resistance reducing portions 37c may be made of a material different from the holder. Resistance reducing portions made of resin may be attached to a molded holder made of aluminum to thereby reduce the overall weight.

Using resin as a material for the resistance reducing portions allows them to be made in a variety of shapes.

The resistance reducing portions and base may be manufactured separately or integrally. Either structure may be made of a material such as a resin or metal. A preferred material is aluminum.

The power tool 1, as described, may be a disc grinder or other power tools, such as a screw tightening machine or an electric drill for boring. The driving source may be an electric motor or an air motor. The power tool may be an electric tool or an air tool.

A disc grinder 101 is described with reference to FIGS. 13 to 19. The up, down, front, rear, left, and right directions are defined as shown in the figures for easy understanding of the description of the disc grinder 101.

Figure 13:
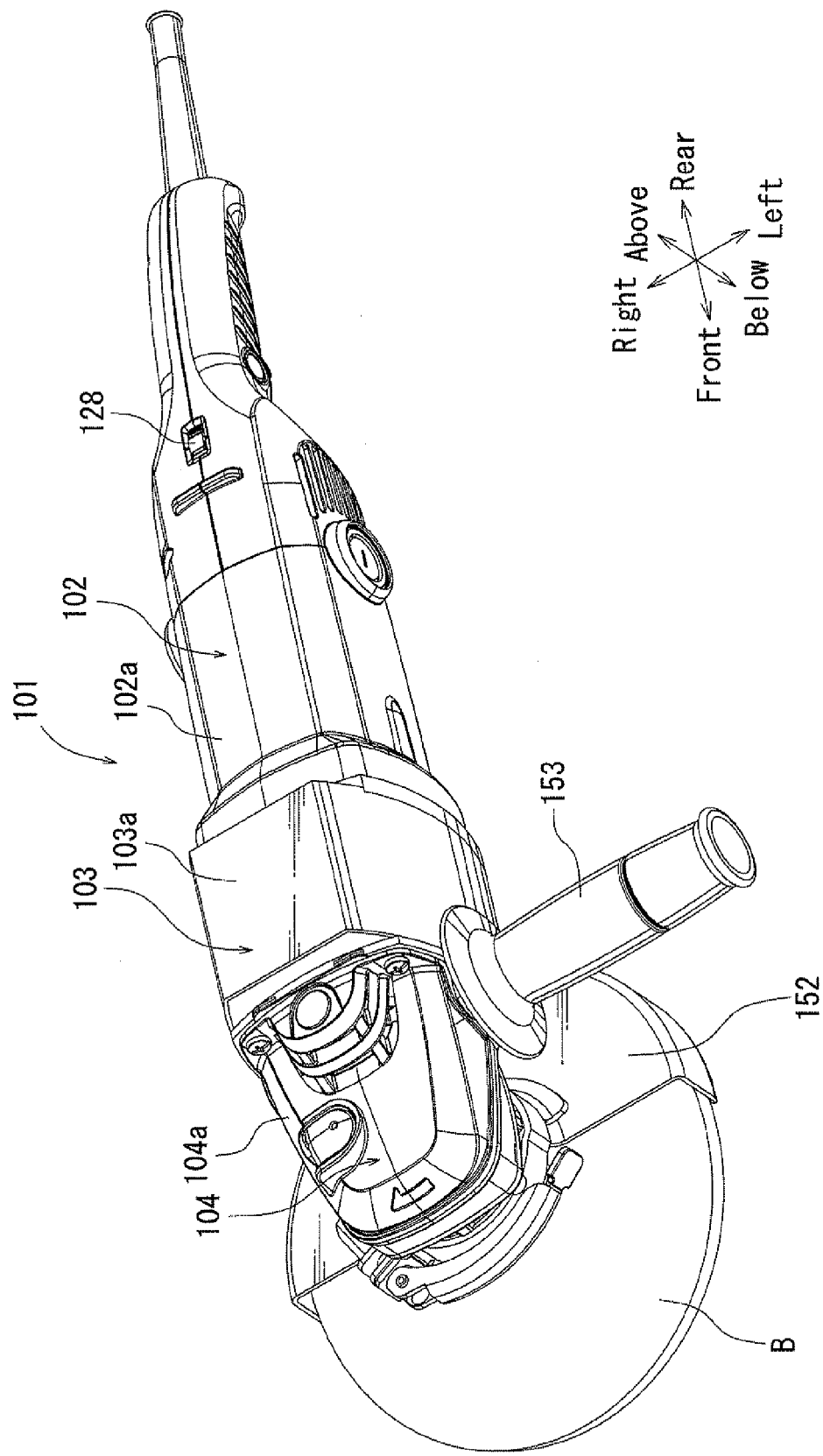
FIG. 13 is a perspective view of an embodiment of a disc grinder.
Figure 14:
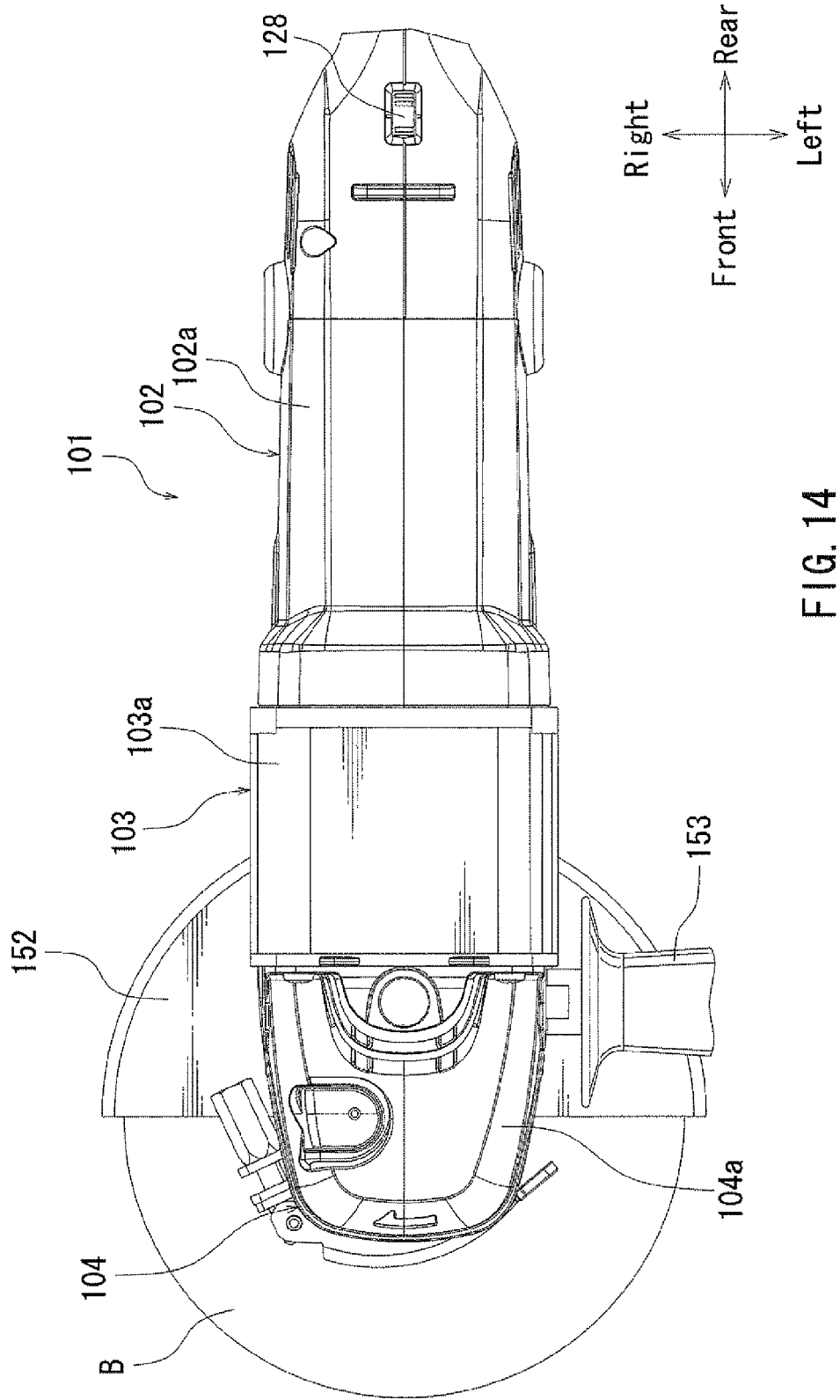
FIG. 14 is a plain view of the disc grinder of FIG. 13.
Figure 15:
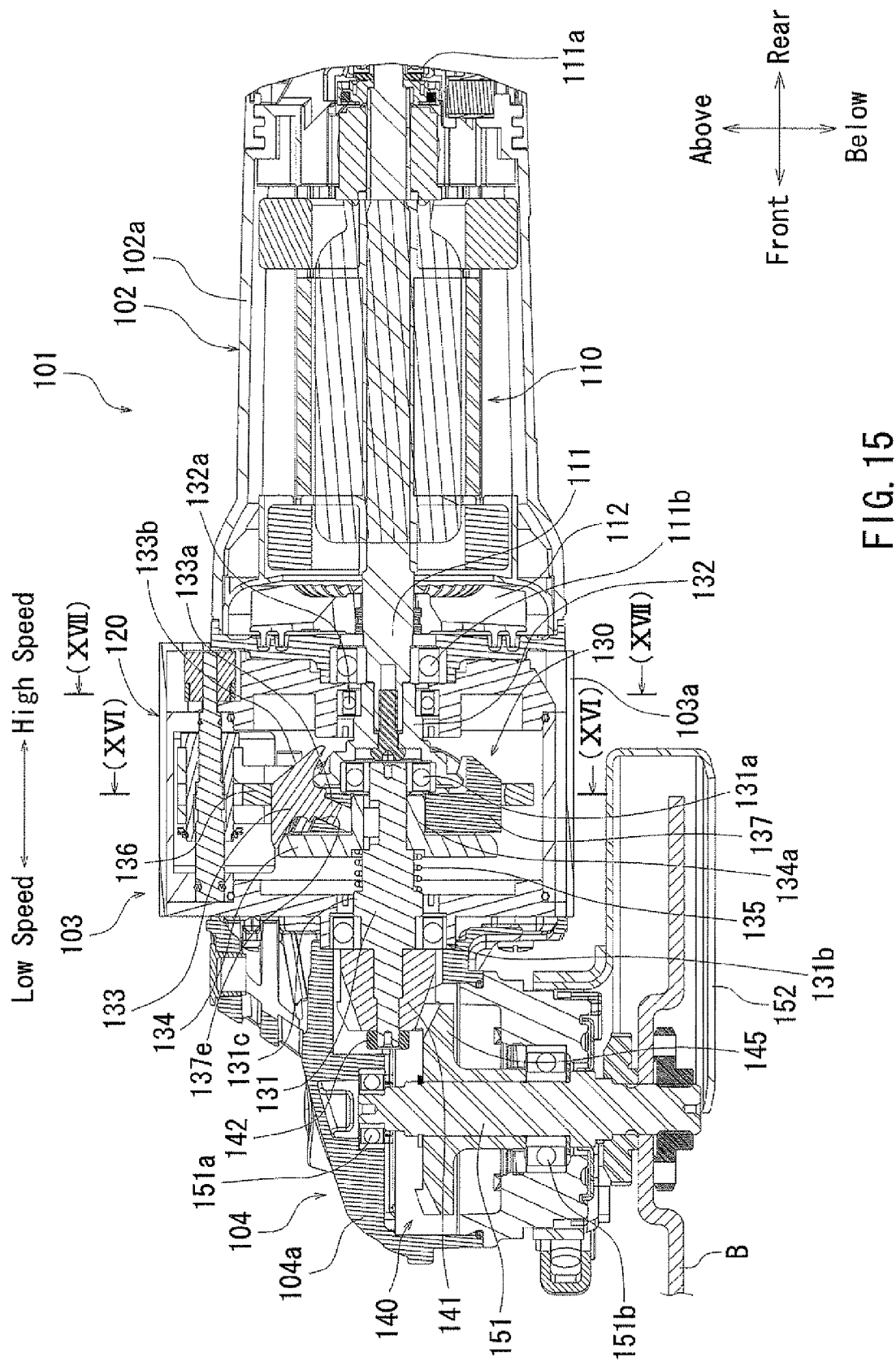
FIG. 15 is a cross-sectional view of the inner mechanism of the disc grinder in FIG. 13.
Figure 16:
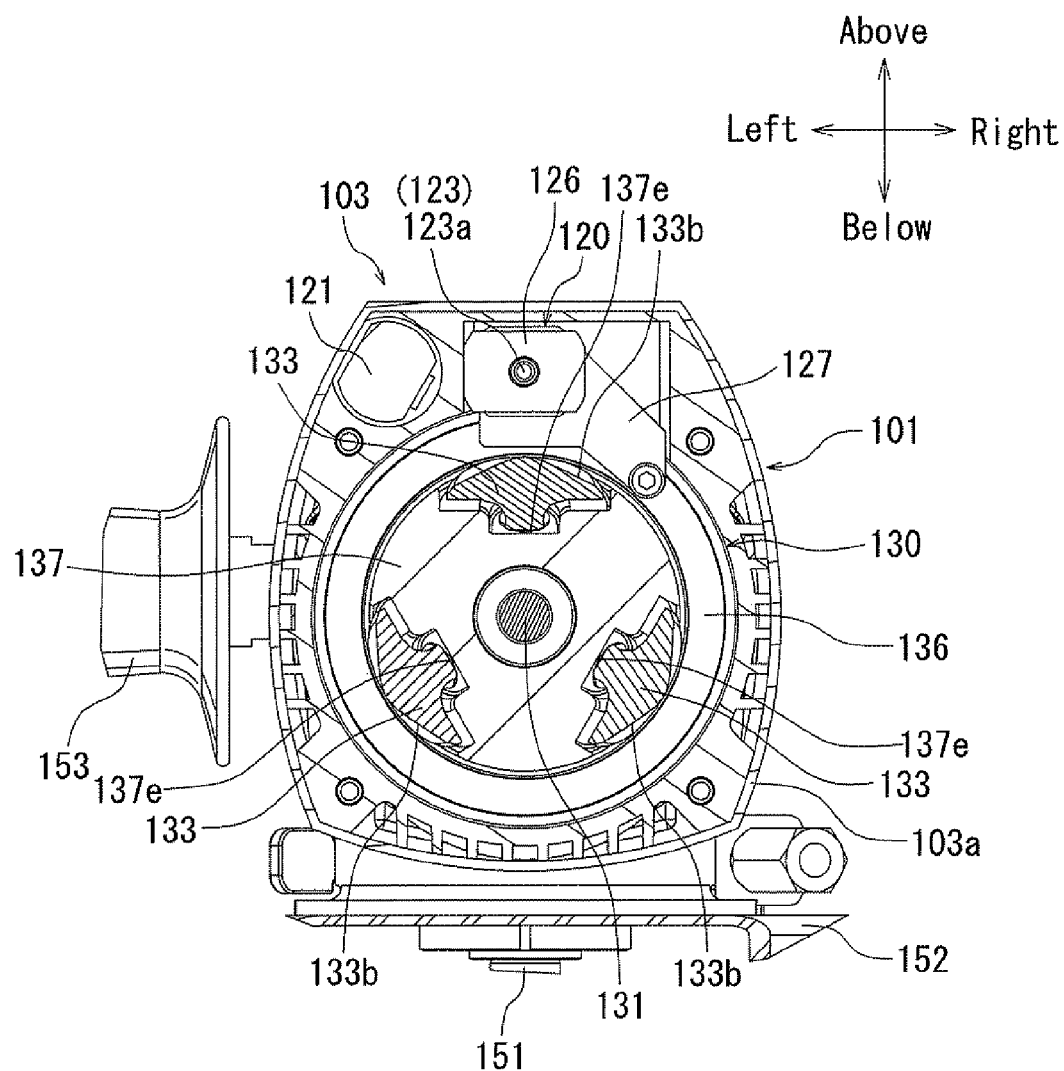
FIG. 16 is a cross-sectional view of a shifting portion taken along line XVI-XVI in FIG. 15.
Figure 17:
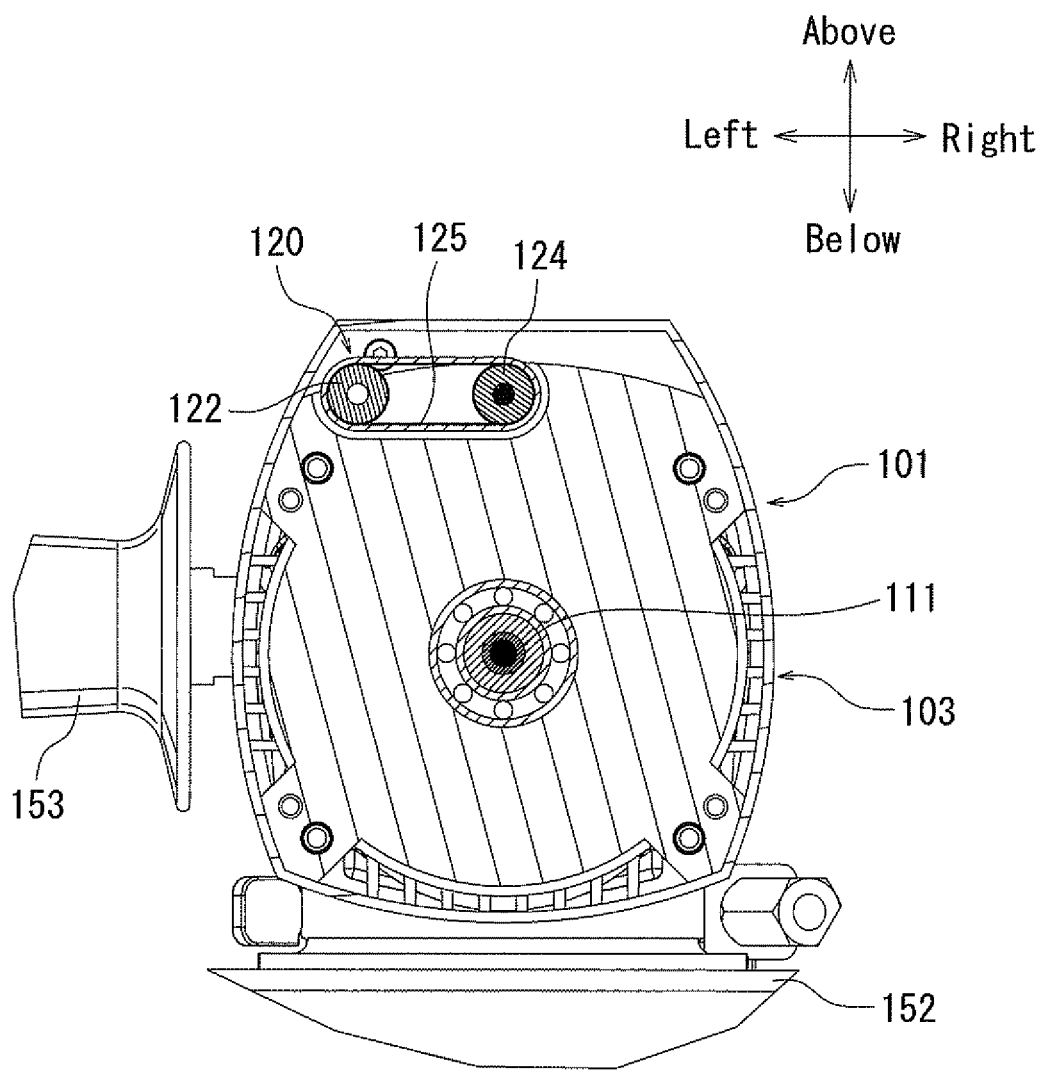
FIG. 17 is a cross-sectional view of a shift control portion taken along line XVII-XVII in FIG. 15.

As shown in FIGS. 13 and 14, the disc grinder 101 includes a tool main body 102, a shift portion 103 and a gear head 104. As shown in FIG. 15, an output spindle 151 protrudes downward from the lower end portion of the gear head portion 104. The output spindle 151 outputs rotational power from the reduction unit 140. A circular grindstone B is fitted on the lower end portion of the output spindle 151. A grind stone cover 152 is mounted behind the grindstone B in the lower side portion of the gear head 104. The grind stone cover 152 covers the rear half circumference of the grindstone B to prevent ground dust from being scattered by the grindstone B. As shown in FIG. 13 a side grip 153 may be held by a user during operation. Such a side grip 153 can be placed on the left, right, top, bottom or any other convenient location on the tool. A plurality of side grips 153 may be used.

As shown in FIG. 15, the tool main body 102 includes a main body case 102a having a cylindrical shape to function as a handle portion. A drive motor 110 exists in the main body case 102a. The drive motor 110 is preferably a brush motor that rotates a motor spindle 111. The motor spindle 111 may be rotatably supported in the main body case 102a by bearings 111a and 111b. A fan 112 for cooling the motor may be fitted on the motor spindle 111.

The fan 12 suctions the external air into the tool main body 102 and sends the air from the rear side to the front side of the tool main body 102. The external air is used to cool the drive motor 110. The motor spindle 111 of the drive motor 110 functions as an output shaft from the drive motor 110 and an input shaft for continuously variable transmission mechanism 130 traction drive.

The continuously variable transmission mechanism 130 shifts the rotation input from the motor spindle 111. The rotation is output to the reduction unit 140 from an intermediate transmission shaft 131 which functions as an output shaft. The intermediate transmission shaft 131 is disposed between the continuously variable transmission mechanism 130 and the reduction unit 140. The continuously variable transmission mechanism 130 transfers rotation to the reduction unit 140. The gear functions as an input shaft. The rotational force is input from the intermediate transmission shaft 131, reduced by the reduction unit 140 and then output to the output spindle 151. The intermediate transmission shaft 131 is fitted in a push roller 134 by a key 138 so as to integrally rotate with the push roller 134.

The shifting portion 103 includes a transmission case 103a connected to the front side of the main body case 102a, a continuously variable transmission mechanism 130 traction drive disposed in the transmission case 103a, and a shift control portion 120 disposed in the transmission case 103a for controlling the continuously variable transmission mechanism 130. The transmission case 103a corresponds to a housing which includes the continuously variable transmission mechanism 130 and the shift control portion 120.

The continuously variable transmission mechanism 130 traction drive shifts or reduces the rotation of the motor spindle 111. The continuously variable transmission mechanism 130 preferably uses three pressure points. It may include a sun roller 132 fitted on a motor spindle 111 of the drive motor 110, a plurality of (preferably three) planetary rollers 133 having a conical circumference, a push roller 134 pressed against the planetary rollers 133, a pressure-adjusting spring 135 for generating a pushing force to the push roller 134, and a shift ring 136 circumscribed to the conical surface 133b. The planetary rollers 133 are preferably in internal contact with the conical surfaces 133b.

The sun roller 132 is fitted at the front-end portion of the motor spindle 111 of the drive motor 110 to integrally rotate with the motor spindle 111. The sun roller 132 is rotatably supported by the bearing 132a in the transmission case 103a. The sun roller 132 may be pressed against the heads of the planetary rollers 133. The rear side of the intermediate transmission shaft 131 may function as an output shaft. It may be rotatably supported by the bearing 131a mounted on the sun roller 132.

The sun roller 132 and the intermediate transmission roller 131 may be positioned on the same rotational axis as that of the motor spindle 111 of the drive motor 110. The front side of the intermediate transmission shaft 131 may be rotatably supported through a ball bearing 131b. The front portion of the intermediate transmission shaft 131 may extend inside the gear head portion 104.

The three planetary rollers 133 are rotatably supported by the holder 137 by a support shaft portion 133a. Support shaft portions 133a may be inserted in support holes 137e in the holder 137 (see FIG. 16). The planetary roller 133 may be supported with the support shaft portion 133a inclined at a predetermined angle.

The push roller 134 may communicate with the intermediate transmission shaft 131 whereby it can be rotated and axially displaced. The push roller 134 may be pressed to the inner surface of each of the planetary rollers 133. A boss portion 34a formed on the rear surface of the push roller 134 rotatably supports the holder 137 supporting the planetary rollers 133. A pressure-adjusting spring 135 may be disposed at the front side of the push roller 134. The pressure-adjusting spring 135 may be a coil spring wound on the outer circumference of the intermediate transmission shaft 131.

The pressure-adjusting spring 135 may be situated between the planetary rollers 133 and the push roller 134. The pressure-adjusting spring 135 may bias the push roller 134 rearward resulting in friction transmission. The drive motor 110 rotates the motor spindle 111 to initially drive the continuously variable transmission mechanism 130.

The pressure-adjusting spring 135 serves to produce friction transmission in the initial drive phase of the continuously variable transmission mechanism 130. The pressure-adjusting spring 135 may be disposed between the continuously variable transmission mechanism 130 and the reduction unit 140. It generates a pressure-adjusting pushing force which is independent of the drive force of the reduction unit 140. The pressure-adjusting spring 135 is one example of a pressure-adjusting pushing means.

When the shift ring 136 is positioned at an area on the planetary rollers 133 with a small diameter, the reduction ratio of the continuously variable transmission mechanism 130 is decreased. Therefore, the continuously variable transmission mechanism 130 rotates the intermediate transmission shaft 131 at a high speed toward the output spindle 151. When the shift ring 136 is positioned at an area on the planetary rollers 133 having a large diameter, the reduction ratio of the continuously variable transmission mechanism 130 is increased. Therefore, the continuously variable transmission mechanism 130 rotates the intermediate transmission shaft 131 at a low speed toward the output spindle 151.

Figure 18:
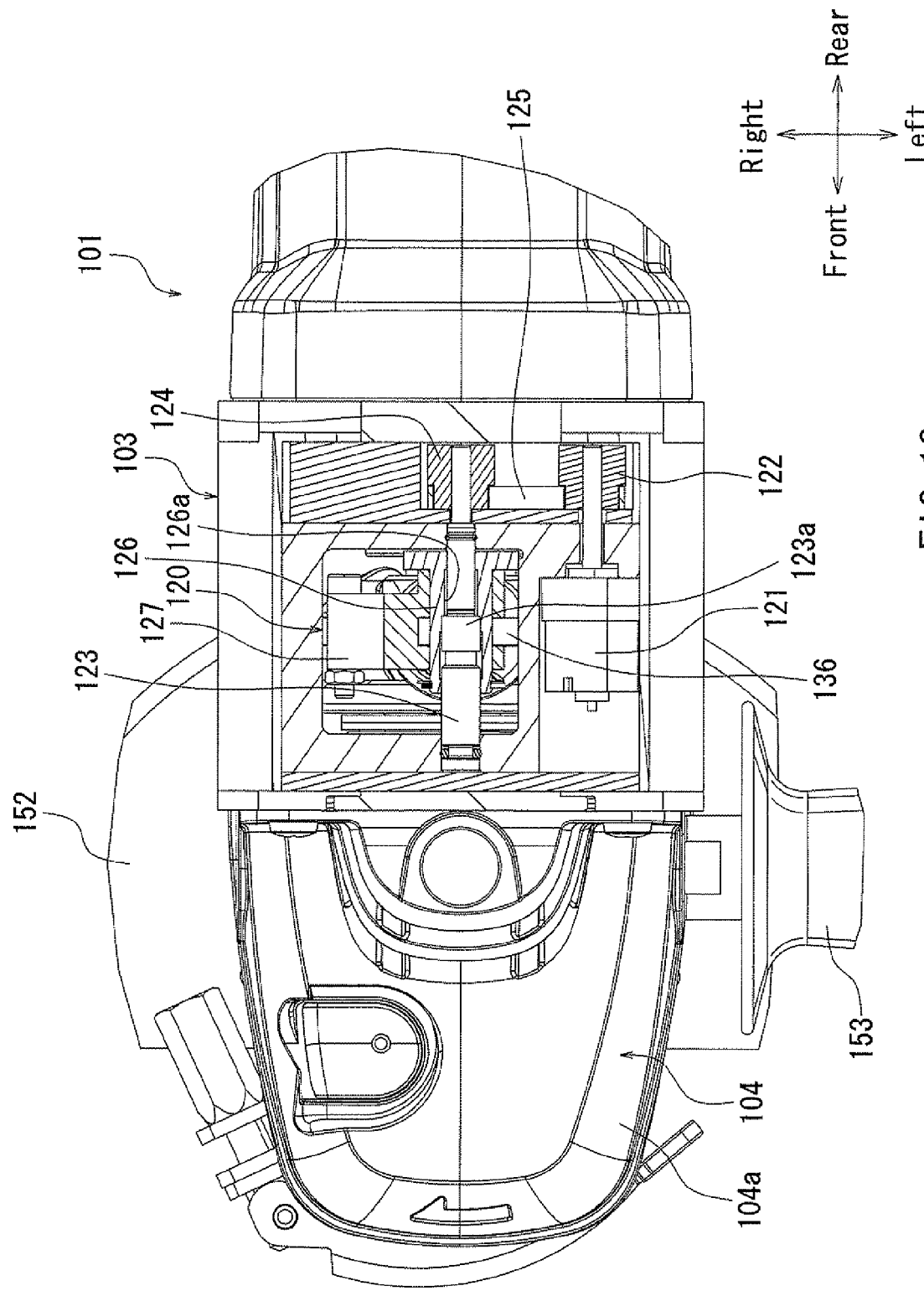
FIG. 18 is a plain view of a front portion of the disc grinder in FIG. 13 showing a cross-sectional view of the shift control position.

The transmission unit 103 includes a transmission control unit 120 for shifting the continuously variable transmission mechanism 130. The shift control unit 120 is preferably located above the shifting portion 103, on the outer circumference of the shift ring 136. As shown in FIG. 18, the shift control portion 120 includes a shift motor 121, a drive pulley 122 fitted on an output shaft of the shift motor 121, an operation shaft 123 arranged in parallel with the output shaft of the shift motor 121, a receiving pulley 124 fitted on the operation shaft 123, and a drive belt 125 (see FIG. 17) held between the drive pulley 122 and the receiving pulley 124.

When the shift motor 121 starts, the drive belt 125, held between the drive pulley 122 and the receiving pulley 124, moves and the operation shaft 123 rotates about the pivot axis. A threaded portion 123a is formed on the operation shaft 123. An operation sleeve 126 is fitted on the circumference of the operation shaft 123. A threaded hole 126a in the operation sleeve 126 is engaged to the threaded portion 123a of the operation shaft 123. When the operation shaft 123 rotates about the pivot axis, the threaded portion 123a moves while being engaged in the threaded hole 126a, such that the operation sleeve 126 moves in the axial direction (front-rear direction in FIG. 18) of the operation shaft 123.

A bifurcated operation arm 127 may be attached to the operation sleeve 126 in order to prevent movement in the axial direction. The outer portion of the shift ring 136 may be interposed in the bifurcated portion of the operation arm 127. The operation sleeve 126 is moved in the front-rear direction by rotation of the operation shaft 123. The shift ring 136 and planetary rollers 133 lie in parallel and move together towards a low speed side or a high-speed side.

When the shift motor 121 starts to the high-speed side, the shift ring 136 is moved to the high-speed side (small diameter side) of the planetary rollers 133 by the rotation of the operation shaft 123. Accordingly, the reduction ratio of the continuously variable transmission mechanism 130 decreases. When the shift motor 121 starts to the low speed side, the shift ring 136 is moved to the low speed side (large diameter side) of the planetary rollers 133 by rotation of the operation shaft 123 and the reduction ratio of the continuously variable transmission mechanism 130 increases. A motor control unit, (which is not shown) controls the starting and stopping of the drive motor 110 and the shift motor 121. As shown in FIG. 13, the operation dial 128 may be disposed behind the disc grinder 101. The adjustment of the operation dial 128 serves to control the continuously variable transmission mechanism 130 reduction ratio.

The intermediate transmission shaft 131 serves as an output shaft and an input shaft. It receives rotation from the continuously variable transmission mechanism 130 and transfers it to the reduction unit. The intermediate transmission shaft 131 is rotatably supported by two bearings: (1) a ball bearing 131a on the sun roller 132 and (2) a ball bearing 131b in the transmission case 103a.

Figure 19:
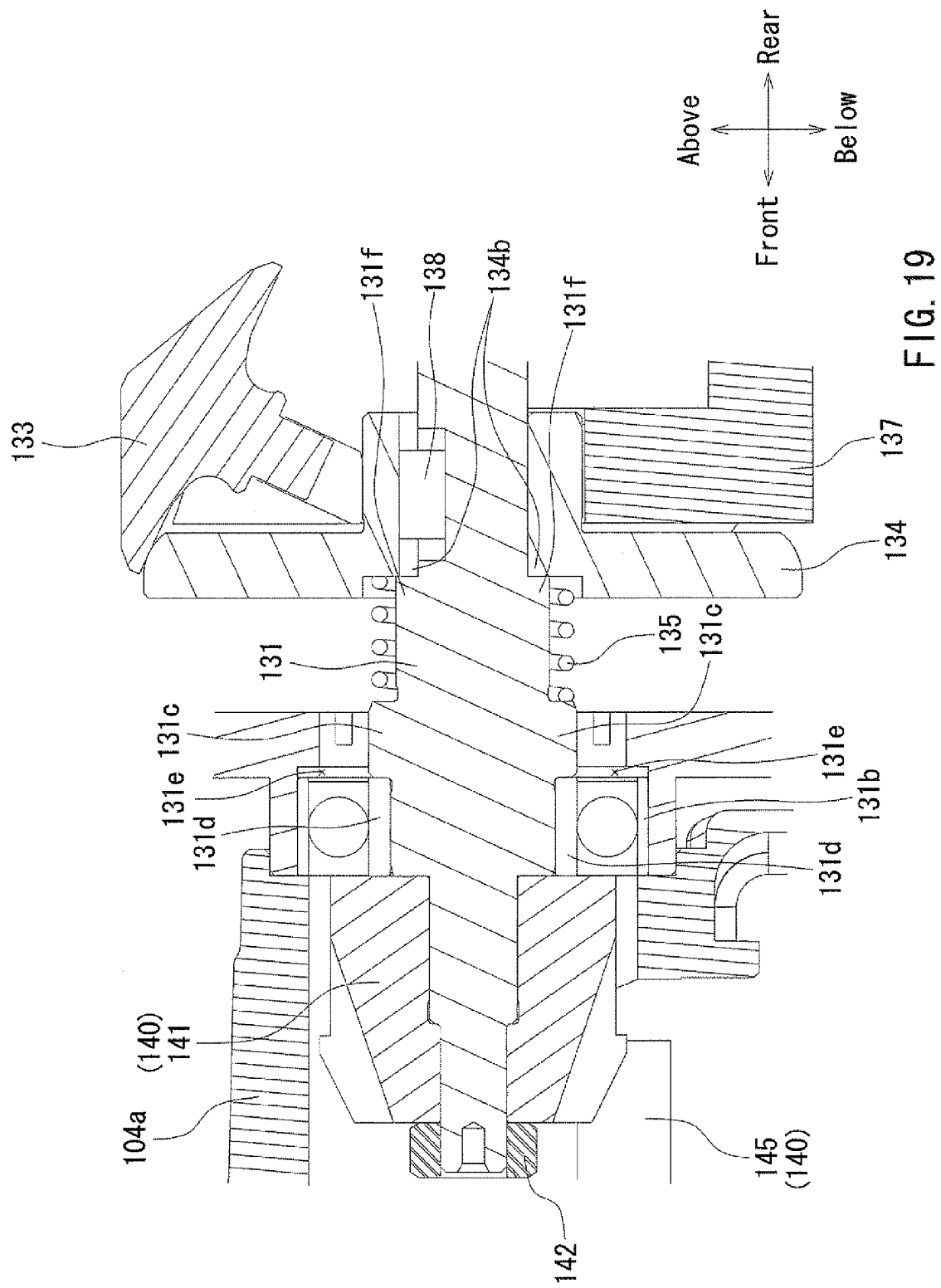
FIG. 19 is an expanded cross-sectional view showing a bearing portion of an end of an intermediate transmission shaft.

The intermediate transmission shaft 131 moves in the axial direction (the front-rear direction in FIG. 19). The intermediate transmission shaft 131 slides integrally with the bearing 131b with respect to the bearing 131a.

As shown in FIG. 19, an inner ring 131d of the ball bearing 131b is disposed between a stepped portion 131c and a drive gear 141. The stepped portion 131c is formed at the outer circumferential portion of the intermediate transmission shaft 131. The drive gear 141 is fixed on the intermediate transmission shaft 131. The inner ring 131d is integrally fixed on the intermediate transmission shaft 131. The intermediate transmission shaft 131 can slide in the front-rear direction relatively to the transmission case 103a. It moves together with the fixed ball bearing 131b. A sliding gap 131e allows the ball bearing 131b to integrally slide with the intermediate transmission shaft 131 to the rear side in FIG. 19. The sliding gap 131e is formed in the transmission case 103a on the rear side portion of the ball bearing 131b.

The gear head portion 104 is preferably located in front of the shift portion 103. The reduction unit 140 is located inside the head case 104a. The output spindle 151 equipped with the grind stone B can protrude downward from the inside of the head case 104a. The head case 104a communicates with the inside of the transmission case 103a.

The reduction unit 140 is an output side gear train on the output side of the continuously variable transmission mechanism 130. The reduction unit 140 serves to convert the rotation from the continuously variable transmission mechanism 130. As shown in FIG. 15, the reduction unit 140 includes a drive gear 141 fitted on the front end of the intermediate transmission shaft 131 by a front clamp 142. It also includes a receiving gear 145 fitted to the base end (upper side) of the output spindle 151.

The output spindle 151 is rotatably supported by bearings 151a and 151b located on the base end side (upper side) and the tip end side (lower side). The bearings 151a and 151b may be fixed to the head case 104a.

The drive gear 141 and the receiving gear 145 may be bevel gears having a conical shape. The drive gear 141 and the receiving gear 145 are engaged by the teeth to transmit rotational motion between two crossing shafts. The drive gear 141 and the receiving gear 145 together constitute a spiral bevel gear (twist bevel gear) transmitting rotational motion between two perpendicular shafts. The drive gear 141 and the receiving gear 145 have engaging teeth to connect with each other during rotation. The number of teeth of the receiving gear 145 is preferably larger than the number of teeth of the drive gear 141. Rotational motion is reduced when rotation is transmitted from the drive gear 141 to the receiving gear 145.

The reduction unit 140 converts the rotation from the intermediate transmission shaft 131 into rotational force in a perpendicular direction. The reduction unit 140 reduces the rotational speed of the intermediate transmission shaft 131. The rotational axis of the intermediate transmission shaft 131 and the rotational axis of the output spindle 151 may be perpendicular to each other.

When the drive gear 141 and the receiving gear 145 are engaged and rotated, the rotation is transmitted from the drive gear 141 to the receiving gear 145. A drive force is generated such that the drive gear 141 and the receiving gear 145 move away from each other. The output spindle 151 may be fixed to the head case 104a via the bearings 151a and 151b.

The intermediate transmission shaft 131 integrally slides with the ball bearing 131b. A stepped contact portion 131f is formed on the intermediate transmission shaft 131. It comes into contact with the push roller 134 of the continuously variable transmission mechanism 130.

The stepped contact portion 131f hits a contact portion 134b on the push roller 134 when the intermediate transmission shaft 131 is moved to the rear side. The intermediate transmission shaft 131 moves the push roller 134 to the rear side to create friction transmission for use by the sun roller 132, the planetary rollers 133, the push roller 134 and the shift ring 136.

The drive force generated between the drive gear 141 and the receiving gear 145 may be transmitted to the continuously variable transmission mechanism 130. The reduction unit 140 transfers this force through the intermediate transmission shaft 131. The drive force is used to create friction transmission in the continuously variable transmission mechanism 130.

The spring force of the pressure-adjusting spring 135 which presses the push roller 134 to the rear side. The pressure-adjusting force of the pressure-adjusting spring 135, is used to provide friction transmission in the continuously variable transmission mechanism 130.

In a disc grinder 101, the following operation may be accomplished. In the continuously variable transmission mechanism 130, the drive motor 110 rotates the sun roller 132. The sun roller 132 engages the pivot axis to thereby rotate the planetary rollers 133. The planetary rollers 133 revolve around the intermediate transmission shaft 131 due to the planetary rollers 133 are pressed on the shift ring 136. The rotation of the planetary rollers 133 causes rotation of the push roller 134. The push roller 134 integrally rotates with the intermediate transmission shaft 131. The intermediate transmission shaft 131 rotates the output spindle 151 through the reduction unit 140.

The continuously variable transmission mechanism 130 traction drive reduces the rotation of the motor spindle 111 through rolling contact friction transmission. The continuously variable transmission mechanism 130 uses pushing force to drive the planetary rollers 133. The drive force created by the drive gear 141 and the receiving gear 145 of the reduction unit push the planetary rollers of the reduction unit 140. Therefore, it is possible to omit a separating structure for generating the pushing force for the friction transmission. This results in a reduction in the number of components of both the continuously variable transmission mechanism 130 and the reduction unit 140.

The drive force generated by the drive gear 141 and the receiving gear 145 is transmitted to the continuously variable transmission mechanism 130 from the reduction unit 140 by the intermediate transmission shaft 131.

The pushing force generated by the friction transmission in the continuously variable transmission mechanism 130 can be set to a desired magnitude by the pressure-adjusting pushing force and the drive force. Depending on the desired operation, the pushing force may be adjusted to create an efficient continuously variable transmission mechanism 130.

The drive gear 141 and the receiving gear 145 of the reduction unit 140 are preferably spiral bevel gears. The pushing force generated by engagement of the driving state of the gears of the reduction unit 140 can be generated by a simple structure. This simplified structure of the disc grinder 101 can reduce manufacturing and labor costs.

The power tool is a continuously variable transmission mechanism 130 traction drive. The output side gear train that alters the rotation of the continuously variable transmission mechanism 130 is disposed on the output side of the continuously variable transmission mechanism 130. The engagement drive force generated by the gears is used as the pushing force provided for the friction transmission in the continuously variable transmission mechanism 130.

The continuously variable transmission mechanism 130 uses rolling contact to ensure friction transmission is maintained. Accordingly, the rotation of the output spindle 151 is reduced by the friction transmission.

The drive gears generate the drive force used by the continuously variable transmission mechanism 130. As the drive gears are part of the gear train, it is unnecessary to use a separate device to supply the drive force. This results in a reduction in the number of components required to operate a continuously variable transmission mechanism 130.

The intermediate transmission shaft 131 may be disposed between the continuously variable transmission mechanism 130 and the output side gear train (reduction unit 140). The intermediate transmission shaft 131 transfers rotational power from the continuously variable transmission mechanism 130 to the gear train. The intermediate transfer shaft 131 transfers the drive force from the output side gear train to the continuously variable transmission mechanism 130. This drive force is used for friction transmission.

The engagement drive force can be directly, simply, and easily transmitted to the continuously variable transmission mechanism 130 from the output side gear train. In this manner, the number of components in a continuously variable transmission mechanism 130 can be reduced in comparison to conventional continuously variable transmission mechanisms.

A pressure-adjusting pushing means (for example, the pressure-adjusting spring 135) generates a pressure-adjusting pushing force. This is a force different from the engagement drive force previously discussed. This pressure-adjusting means may be disposed between the continuously variable transmission mechanism 130 and the output side gear train (reduction unit 140). The pressure-adjusting pushing force is used together with the engagement drive force.

Therefore, the pushing force provided in the friction transmission in the continuously variable transmission mechanism 130 can be set by adjusting the pressure-adjusting force and the drive force. The friction transmission can use the rotation from the continuously variable transmission mechanism 130 to create an appropriate pushing force.

A disc grinder 106 is described in accordance with FIGS. 20 to 23. The disc grinder 106 is different from the disc grinder 101 in its pressure-adjusting cam structure 160 (the structure around the pressure-adjusting spring 135 of the disc grinder 101). Parts in the disc grinder 106 that are the same as those found in the disc grinder 101 embodiment are shown using the same reference numerals.

Figure 20:
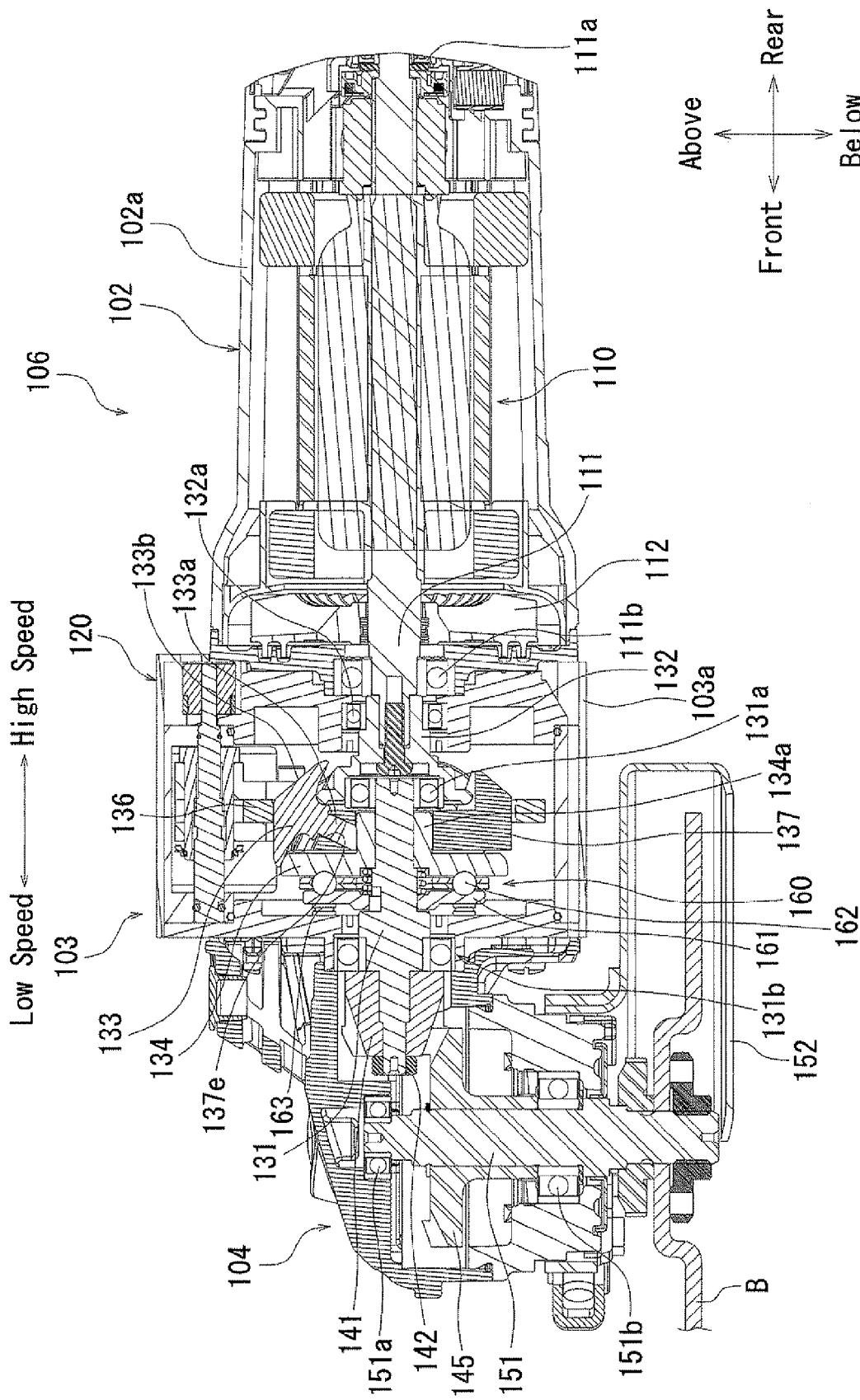
FIG. 20 is a cross-sectional view of an embodiment of an inner mechanism of a disc grinder.

As shown in FIG. 20, the disc grinder 106 includes a pressure-adjusting cam mechanism 160 between the continuously variable transmission mechanism 130 and the reduction unit 140. The pressure-adjusting cam mechanism 160, generates a pressure-adjusting pushing force. This force is different from the drive force generated by the reduction unit 140.

The pressure-adjusting cam mechanism 160 transmits the torque output from the continuously variable transmission mechanism 130 to the reduction unit 140.

The pressure-adjusting cam mechanism 160 may be positioned in front of the push roller 134 and behind the reduction unit 140. The rotation output from the side of the continuously variable transmission mechanism 130 is input to the reduction unit 140. The pressure-adjusting cam mechanism 160 transmits the rotation output from the side of the continuously variable transmission mechanism 130 to the intermediate transmission shaft 131.

The pressure-adjusting cam mechanism 160 uses the torque received from the side of the continuously variable transmission mechanism 130 and the load received from the side of the reduction unit 140 to generate a pressure-adjusting pushing force. This occurs when the rotation output from the continuously variable transmission mechanism 130 is transmitted to the intermediate transmission shaft 131.

Figure 21:
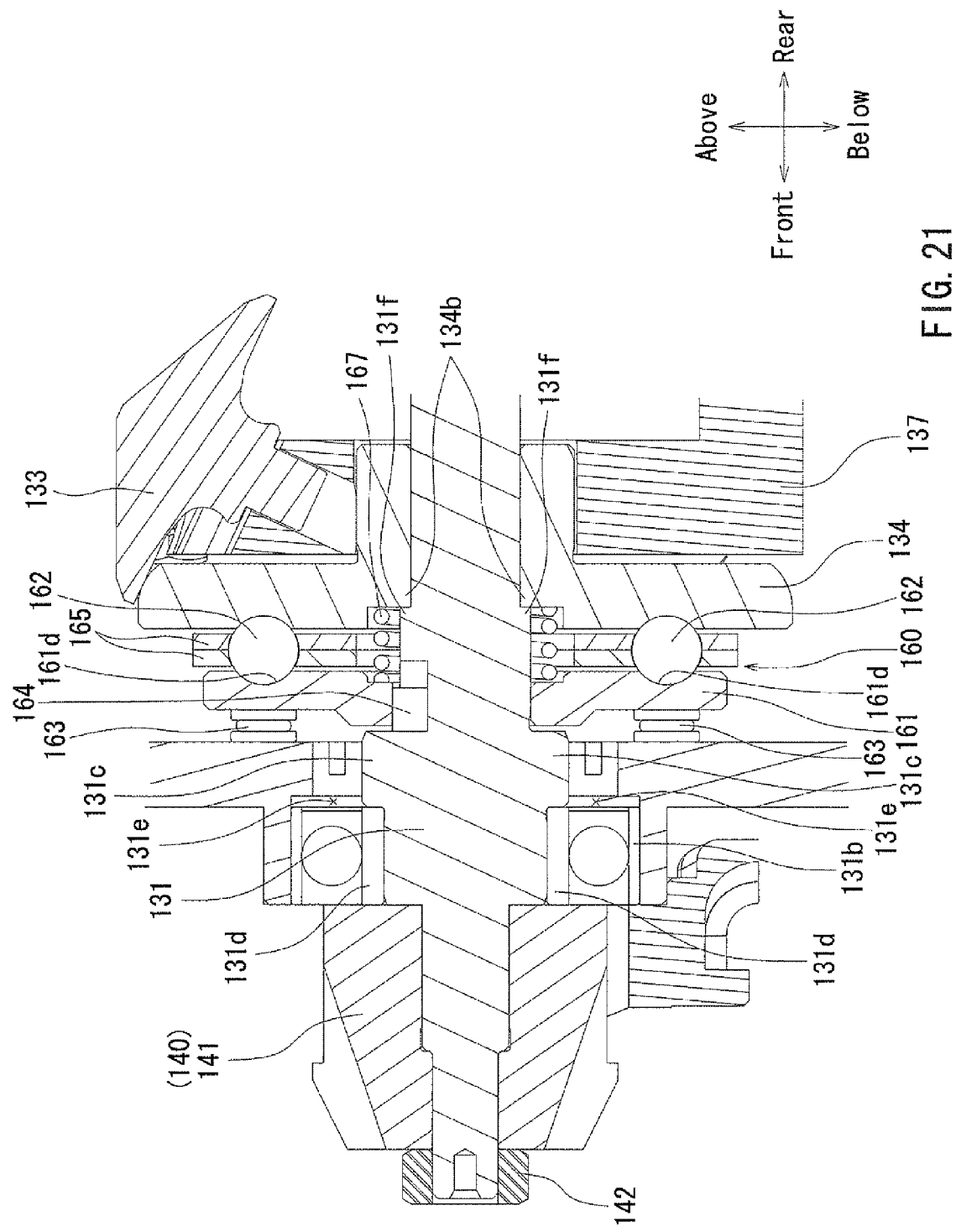
FIG. 21 is an expanded cross-sectional view showing a pressure-adjusting cam structure.

As shown in FIG. 21, the pressure-adjusting cam mechanism 160, includes a pressing plate 161, a plurality of balls 162, and a thrust needle bearing 163. The plurality of balls 162 is preferably made of steel. The pressing plate 161 is positioned ahead of the push roller 134. The front surface of the pressing plate 161 may be supported by the thrust needle bearing 163. The rear surface of the pressure plate 161 may be supported by the push roller 134 by the plurality of balls 162. The plurality of balls 162 may be disposed between the pressing plate 161 and the push roller 134.

Each of the balls 162 may be embedded in cam grooves 161*d* formed on the rear surface of the pressing plate 161. The grooves may be interposed on the pressing plate 161 and the push roller 134. The thrust needle bearing 163 rotatably supports the pressing plate 161 with respect to the transmission case 103*a*. A steel ball-retaining member 165 holds the balls 162 between the pressing plate 161 and the push roller 134.

A pressure-adjusting spring 167 may be disposed between the pressing plate 161 and the push roller 134. The pressure-adjusting spring 167 may be a compression spring. Its front end may contact the pressing plate 161 and the rear end may contact the push roller 134. The pressure-adjusting spring 167 may be supported by the pressing plate 161. It biases the push roller 134 towards the rear side in the FIG. 19. The pressure-adjusting spring 167 biases the push roller 134 to the rear to create friction transmission. This friction transmission is used in the initial driving of the sun roller 132, the planetary rollers 133, the push roller 134 and the shift ring 136.

Figure 22:
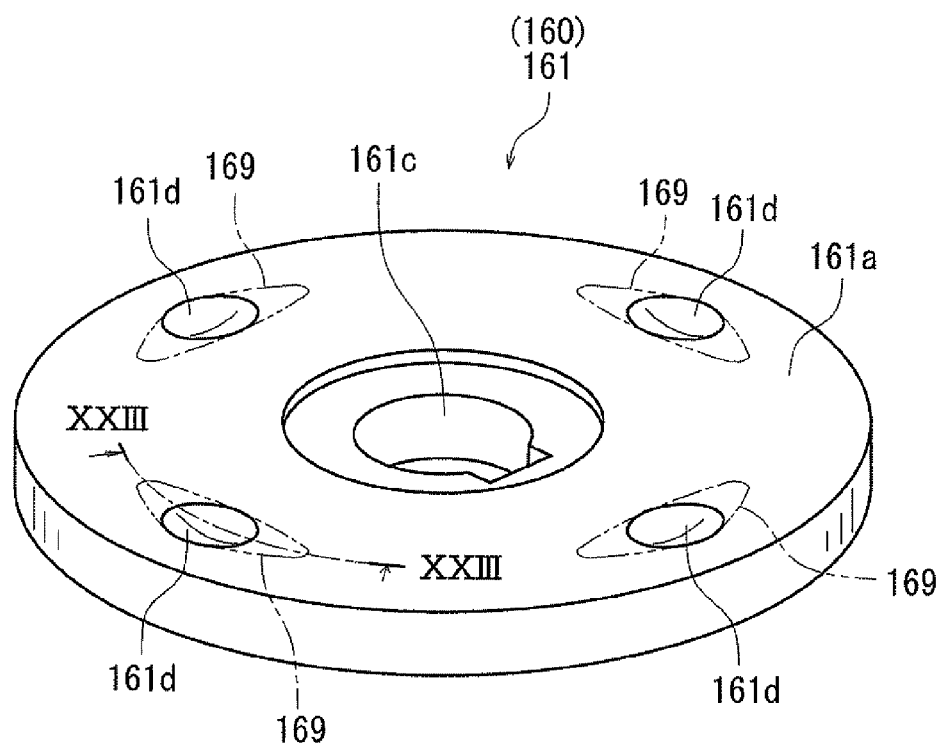
FIG. 22 is a perspective view of a pressing plate.
Figure 23:
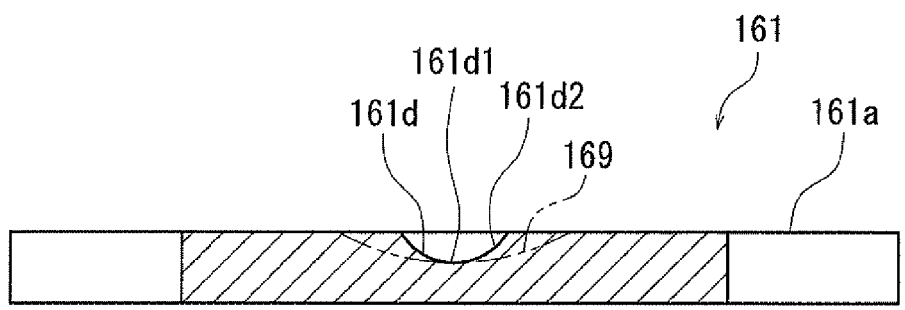
FIG. 23 is a cross-sectional view of the pressing plate taken along line XXIII-XXIII in FIG. 22.

As shown in FIG. 22, four cam grooves 161d are formed with regular intervals on the rear surface 161a of the pressing plate 161. These grooves 161d serve to hold a plurality of steel balls 162. As shown in FIG. 23, the cam grooves 161d may change in depth in the circumferential direction. The center portion of the cam groove 161d is preferably its deepest portion.

The shape of cam grooves 169 of related art are shown by phantom lines in FIGS. 22 and 23. A fitting hole 161c for fitting the intermediate transmission shaft 131 is formed at the center portion of the pressing plate 161. The intermediate transmission shaft 131 is fitted in the fitting hole 161c and the pressing plate 161. The intermediate transmission shaft 131 is engaged by a key 164 such that the pressing plate 161 and the intermediate transmission shaft 131 may be integrally rotated.

Normally, the four steel balls 162 are fitted in the deepest portions 161d1 of the cam grooves 161d. The continuously variable transmission mechanism 130 generates rotation which is transmitted to the intermediate transmission shaft 131 through the pressure-adjusting cam mechanism 160. When an appropriate rotational load is generated between the push roller 134 and the pressing plate 161, the relative positions of the push roller 134 and the pressing plate 161 are displaced in the rotational direction. The balls 162 fitted in the deepest portions 161d1 of the cam grooves 161d may then be displaced to the inclined portions. When this occurs, the distance between the pressing plate 161 and the push roller 134 is increased.

The balls 162 thereby increase the pressing force of the pressing plate 161 and the push roller 134. A rotational load may be generated in association with the torque of the rotation output from the continuously variable transmission mechanism 130. The intermediate transmission shaft 131 receives a rotational load.

The pressing plate 161 is supported by the transmission case 103a through the thrust needle bearing 163. Therefore, the steel balls 162 bias the push roller 134 toward the rear side. Accordingly, the pressing force of the push roller 134 against the planetary rollers 133 increases. The sun roller 132 is pressed to the heads of the planetary rollers 133 and the conical surfaces 133h of the planetary rollers 133 are pressed to the shift ring 136.

The pressure-adjusting cam mechanism 160 creates the pressure-adjusting pushing force. This pressure-adjusting pushing force is similar to the drive force of the reduction unit 140. The continuously variable transmission mechanism 130 uses the pressure-adjusting pushing force for friction transmission. This pressure-adjusting force of the continuously variable transmission mechanism 130 is used in conjunction with the drive force of the reduction unit 140.

When the rotation is transmitted to the receiving gear 145 from the drive gear 141, a drive force is generated such that the drive gear 141 and the receiving gear 145 are moved away from each other. The drive force is transmitted to the intermediate transmission shaft 131 by the drive gear 141.

The intermediate transmission shaft 131 is configured to integrally slide with the ball bearing 131b in the transmission case 103a. A stepped contact portion 131f comes in contact with the push roller 134 of the continuously variable transmission mechanism 130. The stepped contact portion 131f also comes in contact with a contact portion 134b.

The intermediate transmission shaft 131 moves the pushing roller 134 to the rear side to create friction transmission for the sun roller 132, the planetary rollers 133, the pushing roller 134, and the shift ring 136. Engagement of the drive gear 141 and the receiving gear 145 of the reduction unit 140 is used to create the pushing force used in friction transmission.

The reduction unit 140 transmits the drive force to the intermediate transmission shaft 131. The intermediate transmission shaft 131 transfers the force to the continuously variable transmission mechanism 130 to be used for friction transmission.

Engagement of the drive gear 141 and the receiving gear 145 generates a pushing force to be used for friction transmission. It is possible to set the pushing force to a level that is smaller than that found in the related art.

The cam grooves 161d formed on the pressing plate 161 can have a shorter radial length than the cam grooves of the related art.

The pressure-adjusting cam mechanism 160 transmits the torque output from the continuously variable transmission mechanism 130 to the intermediate transmission shaft 131.

A pressure-adjusting force pushes against the pressure-adjusting cam 160. The pressure-adjusting cam 160 may be supported by the transmission case 103a and transmit a reaction force to the continuously variable transmission mechanism 130. It is possible to generate the pressure-adjusting pushing force (force pressing the push roller 134 to the rear side) without interfering with the drive force. The drive force is generated by the reduction unit 140 when the drive gear 141 and the receiving gear 145 engage.

The pressure-adjusting force of the pressure-adjusting cam mechanism 160 can be a pushing force completely separate from the drive force. Due to this configuration, independent adjustments may be made to the drive force and the pressure-adjusting force.

The pressure-adjusting means transmits torque from the continuously variable transmission mechanism 130 to the gear train. The pressure-adjusting cam mechanism 160 uses torque from the continuously variable transmission mechanism 130 and load from the gear train (reduction unit 140) to generate a pressure-adjusting force.

The pressure-adjusting means uses the rotation output from the continuously variable transmission mechanism 130. Accordingly, it is possible to manufacture a power tool (for example, the disc grinder 106) having a simple structure. The pressure-adjusting cam mechanism 160 generates a pressure-adjusting force by using the torque received from the continuously variable transmission mechanism 130 and the load received from the gear train. Therefore, the pressure-adjusting cam mechanism 160 can reduce the number of components necessary in generating the pressure-adjusting pushing force.

A pressure-adjusting force pushes against the pressure-adjusting cam 160. The pressure-adjusting cam 160 may be supported by the transmission case 103a and transmit a reaction force to the continuously variable transmission mechanism 130. It is possible to generate the pressure-adjusting pushing force (force pressing the push roller 134 to the rear side) without interfering with the drive force. The drive force is generated by the reduction unit 140 when the drive gear 141 and the receiving gear engage.

Therefore, it is possible to generate a pressure-adjusting pushing force without interfering with the engagement drive force generated by the engagement of the gears (drive gear 141 and receiving gear 145). These two gears constitute the output side gear train. Therefore, the pressure-adjusting cam mechanism 160 can generate a pressure-adjusting force completely separate from the engagement drive force. Consequently, it is possible to easily adjust the pressure-adjusting pushing force and the engagement drive force.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the present invention should not be limited to the representative configurations, but may be modified as described below.

The gear train, comprised of the drive gear 141 and the receiving gear 145, may be implemented in any configuration, as long as the gears generate a pushing force in the drive state. The shape, the engagement configuration, and the quantity of the gears involved may vary. For example, the drive gear 141 and the receiving gear 145 may be spiral bevel gears, straight bevel gears, helical gears, spur gears, or the like. Also, the gears may be a combination of different or various gears.

Because the gear train can be used with various types of gears, a manufacturer can choose from a range of gears suitable of their needs The pressure-adjusting means may be a spring 135, a cam mechanism 160, or any other suitable structural configuration. For example, an actuator may be used. This actuator could be is electrically controlled. It may be disposed between a continuously variable transmission mechanism and an output side gear train.

The power tool may be a disc grinder or appropriate power tools, such as a screw tightening machine or an electric drill for boring. The power-driving source may be an electric motor, as described above, or may be an air motor.

This invention claims:

1. A power tool comprising:
a drive motor; and
a continuously variable transmission mechanism comprising:
a sun roller rotated by the drive motor,
a plurality of planetary rollers where the sun roller is pressed,
a holder radially supporting the plurality of planetary rollers,
a shift ring being in internal contact with the plurality of planetary rollers, and
resistance-reducing portions disposed at the holder, the resistance-reducing portions protrude radially outward from and are circumferentially distributed about the holder to fill gaps between the planetary rollers.

2. The power tool of claim 1 further comprising:
a disc-shaped base of the holder;
the base comprising
a circumferential surface to support the planetary rollers, and
a gap between the base and the shift ring filled with the resistance-reducing portions.

3. The power tool of claim 1, wherein the resistance-reducing portions have a blade-like shape extending in a rearward direction of the holder.

4. The power tool of claim 1, wherein the resistance reducing portions are formed in a symmetric shape.

5. The power tool of claim 1 further comprising:
a predetermined gap defined between the planetary roller and the resistance-reducing portions.

6. The power tool of claim 1 further comprising:
a portion of the resistance reducing portions protruding toward the sun roller in an axial direction of the sun roller to cover a radial outer surface of the sun roller, and
a space surrounded by the resistance reducing portion the space being defined in the holder, wherein the sun roller is provided in the space.

7. The power tool of claim 1 further comprising:
a radial outer surface of the resistance reducing portions, and
a scraping groove formed on the radial outer surface configured to scrape a lubricant, the scraping groove extending in a circumferential direction.

8. The power tool of claim 1, wherein the resistance reducing portions are made of resin.

9. The power tool of claim 1 further comprising:
a gear train disposed at an output side of the continuously variable transmission mechanism; the gear train configured to change a first rotation from the continuously variable transmission mechanism into a second rotation which is different from the first rotation;
the gear train having a plurality of gears; the gears configured to generate a engagement drive force generated between the gears; and
wherein the engagement drive force is used for friction transmission in the continuously variable transmission mechanism.

10. The power tool of claim 9 further comprising:
an intermediate transmission shaft located between the continuously variable transmission mechanism and the gear train, configured to input the rotation from the continuously variable transmission mechanism to the gear train; and
wherein the engagement drive force is transmitted from the gear train to the intermediate transmission shaft;
the intermediate transmission shaft configured to transmit the engagement drive force to the continuously variable transmission mechanism.

11. The power tool of claim 9 further comprising:
a pressure-adjusting pushing means located between the continuously variable transmission mechanism and the gear train, the pressure-adjusting pushing means configured to generate a pressure-adjusting pushing force; and
wherein the pressure-adjusting pushing force is used together with the engagement drive force for the friction transmission.

12. The power tool of claim 11 further comprising:
the pressure-adjusting means being a pressure-adjusting cam configured to receive torque from the continuously variable transmission mechanism and a load from the gear train to generate a pressure-adjusting force.

13. The power tool of claim 11 further comprising:
a housing configured to support a reaction force; this reaction force against the pressure-adjusting pushing force generated by the pressure-adjusting cam.

14. The power tool of claim 9, wherein the gears are one of a spiral bevel gear, a straight bevel gear, or a helical gear.

* * * * *